US012666490B2

(12) United States Patent
Baracca et al.

(10) Patent No.: US 12,666,490 B2
(45) Date of Patent: Jun. 23, 2026

(54) TRANSMISSION CONFIGURATION INDICATOR ACTIVATION

(71) Applicant: NOKIA TECHNOLOGIES OY, Espoo (FI)

(72) Inventors: Paolo Baracca, Munich (DE); Rafael Cauduro Dias De Paiva, Aalborg (DK); Riikka Karoliina Dimnik, Kirkkonummi (FI); Samantha Caporal Del Barrio, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/056,698

(22) Filed: Feb. 18, 2025

(65) Prior Publication Data

US 2025/0267751 A1     Aug. 21, 2025

(30) Foreign Application Priority Data

Feb. 19, 2024     (FI) ..................................... 20245197

(51) Int. Cl.
*H04W 76/20* (2018.01)
*H04B 17/318* (2015.01)
(Continued)

(52) U.S. Cl.
CPC .......... *H04W 76/20* (2018.02); *H04B 17/328* (2023.05); *H04W 52/365* (2013.01); *H04W 80/02* (2013.01)

(58) Field of Classification Search
CPC ... H04W 76/20; H04W 52/365; H04B 17/328
See application file for complete search history.

(56) References Cited

U.S. PATENT DOCUMENTS

2023/0130286 A1     4/2023   Leng et al.
2023/0216565 A1*    7/2023   Kwak .................. H04B 7/0695
                                                375/267

(Continued)

FOREIGN PATENT DOCUMENTS

WO     2023002412 A1     1/2023
WO     2023023935 A1     3/2023
(Continued)

OTHER PUBLICATIONS

International Search Report and Written Opinion for International Application No. PCT/EP2025/052301, mailed on Apr. 16, 2025, 12 pages.

(Continued)

*Primary Examiner* — Charles C Jiang
*Assistant Examiner* — Ryan C Kavleski
(74) *Attorney, Agent, or Firm* — Brake Hughes Bellermann LLP

(57) ABSTRACT

Example embodiments of the disclosure relate to methods, apparatuses, and a computer readable storage medium for transmission configuration indicator (TCI) activation. In a method, a first apparatus receives a first indication indicating a first switch from a first source TCI state to a first target TCI state is to be performed, and a second indication indicating a second switch from a second source TCI state to a second target TCI state is to be performed. The first apparatus determines an order for performing the first switch and the second switch, the order being associated with at least one of first information about a first transmission between the first network device and the first apparatus or second information about a second transmission between the second network device and the first apparatus.

20 Claims, 9 Drawing Sheets

(51) Int. Cl.
H04W 52/36 (2009.01)
H04W 80/02 (2009.01)

(56) References Cited

U.S. PATENT DOCUMENTS

2024/0204970 A1 * 6/2024 Cui ........................ H04L 5/0044
2025/0055660 A1 * 2/2025 Rudolf ................... H04L 5/0035

FOREIGN PATENT DOCUMENTS

WO          2023220950  A1    11/2023
WO          2024007316  A1     1/2024
WO    WO-2024197484  A1  * 10/2024
WO    WO-2024240380  A1  * 11/2024  ........... H04L 5/0053

OTHER PUBLICATIONS

3GPP TSG-RAN WG4 Meeting #110, R4-2402020; "Discussion on Rel-18 Extension of Unified TCI Framework for mTRP Operation"; Agenda Item: 8.21.2.3; Source: Nokia, Nokia Shanghai Bell; Athens, Greece; Feb. 26-Mar. 1, 2024; 7 pages.
3GPP TSG-RAN WG4 Meeting# 109, R4-2318584; "On RRM Requirements for Unified TCI Framework with mTRP"; Agenda Item: 8.29.2.3; Source: Apple; Chicago, Illinois, USA; Nov. 13-17, 2023; 9 pages.
First Opinion on Patentability for Finnish Patent Application No. 20245197, mailed on Oct. 18, 2024, 10 pages.
3GPP TSG RAN WG4 Meeting #108bis; R4-2315752; "On TCI State Switch Delay for Multi-Rx"; Agenda item: 5.7.2.5; Source: vivo; Xiamen, China; Oct. 9-13, 2023; 5 pages.

* cited by examiner

900

910

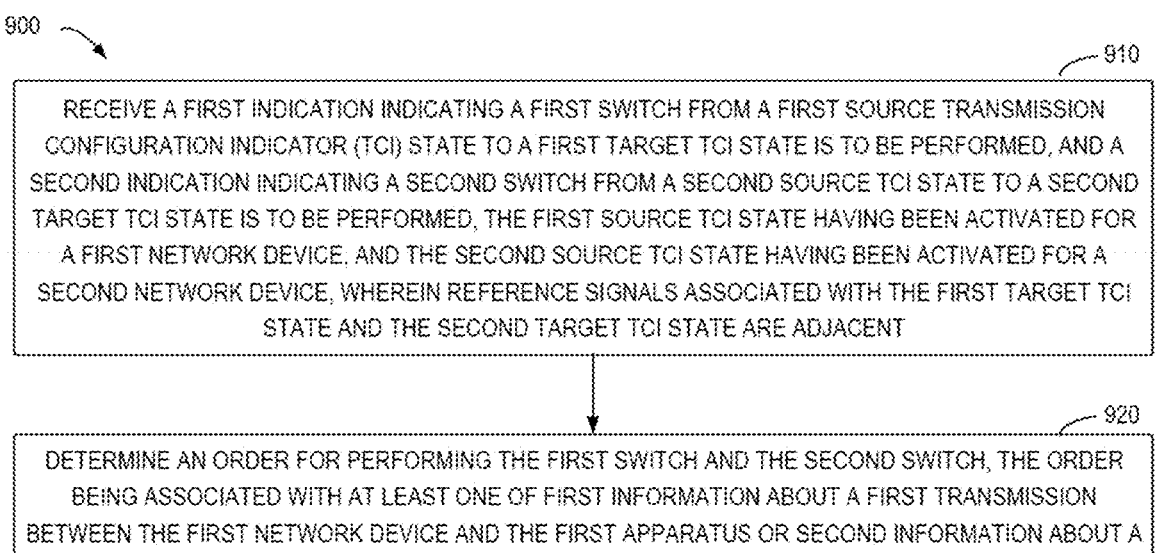

RECEIVE A FIRST INDICATION INDICATING A FIRST SWITCH FROM A FIRST SOURCE TRANSMISSION CONFIGURATION INDICATOR (TCI) STATE TO A FIRST TARGET TCI STATE IS TO BE PERFORMED, AND A SECOND INDICATION INDICATING A SECOND SWITCH FROM A SECOND SOURCE TCI STATE TO A SECOND TARGET TCI STATE IS TO BE PERFORMED, THE FIRST SOURCE TCI STATE HAVING BEEN ACTIVATED FOR A FIRST NETWORK DEVICE, AND THE SECOND SOURCE TCI STATE HAVING BEEN ACTIVATED FOR A SECOND NETWORK DEVICE, WHEREIN REFERENCE SIGNALS ASSOCIATED WITH THE FIRST TARGET TCI STATE AND THE SECOND TARGET TCI STATE ARE ADJACENT

920

DETERMINE AN ORDER FOR PERFORMING THE FIRST SWITCH AND THE SECOND SWITCH, THE ORDER BEING ASSOCIATED WITH AT LEAST ONE OF FIRST INFORMATION ABOUT A FIRST TRANSMISSION BETWEEN THE FIRST NETWORK DEVICE AND THE FIRST APPARATUS OR SECOND INFORMATION ABOUT A SECOND TRANSMISSION BETWEEN THE SECOND NETWORK DEVICE AND THE FIRST APPARATUS

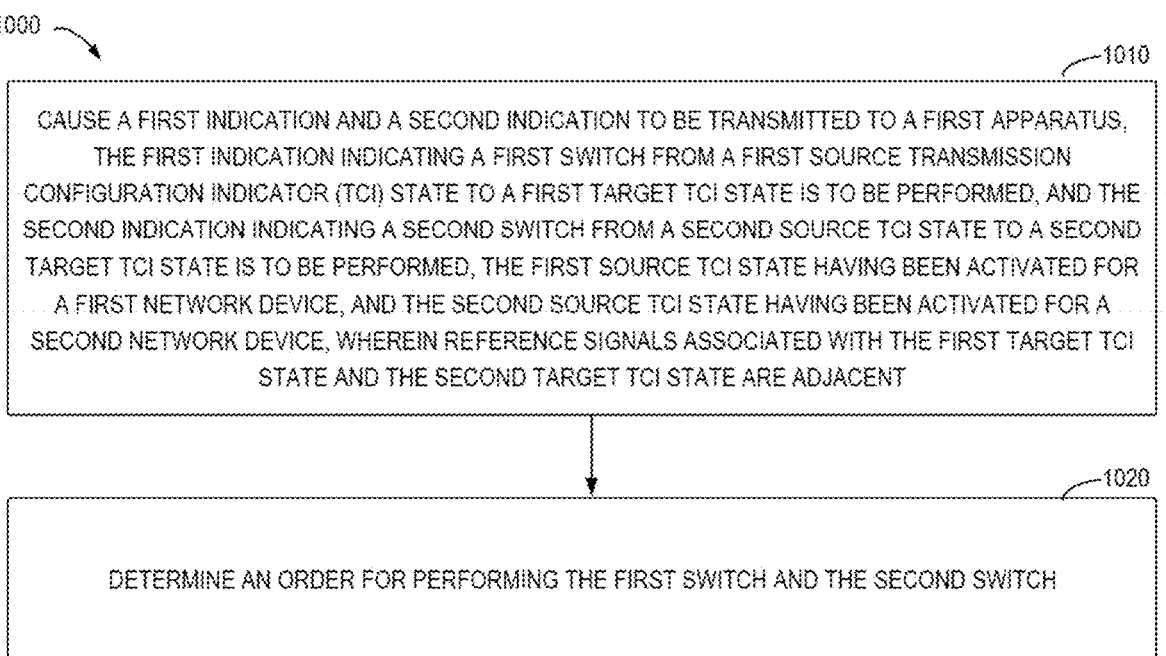

CAUSE A FIRST INDICATION AND A SECOND INDICATION TO BE TRANSMITTED TO A FIRST APPARATUS, THE FIRST INDICATION INDICATING A FIRST SWITCH FROM A FIRST SOURCE TRANSMISSION CONFIGURATION INDICATOR (TCI) STATE TO A FIRST TARGET TCI STATE IS TO BE PERFORMED, AND THE SECOND INDICATION INDICATING A SECOND SWITCH FROM A SECOND SOURCE TCI STATE TO A SECOND TARGET TCI STATE IS TO BE PERFORMED, THE FIRST SOURCE TCI STATE HAVING BEEN ACTIVATED FOR A FIRST NETWORK DEVICE, AND THE SECOND SOURCE TCI STATE HAVING BEEN ACTIVATED FOR A SECOND NETWORK DEVICE, WHEREIN REFERENCE SIGNALS ASSOCIATED WITH THE FIRST TARGET TCI STATE AND THE SECOND TARGET TCI STATE ARE ADJACENT

1020

DETERMINE AN ORDER FOR PERFORMING THE FIRST SWITCH AND THE SECOND SWITCH

FIG. 10

TRANSMISSION CONFIGURATION INDICATOR ACTIVATION

RELATED APPLICATION

This application claims priority from, and the benefit of, Finnish Application No. 20245197, filed on Feb. 19, 2024, the contents of which is incorporated herein by reference in its entirety.

FIELD

Various example embodiments of the present disclosure generally relate to the field of telecommunication and in particular, to methods, apparatuses and a computer readable storage medium for transmission configuration indicator (TCI) activation.

BACKGROUND

Relevant technologies of New Radio (NR) have designed a way to indicate beams of different channels and/or reference signals through TCI states. Taking the Physical Downlink Shared Channel (PDSCH) as an example, a set of available TCI states is configured via a RRC configuration. Some TCI states in the set of available TCI states are activated via MAC CE. A TCI state is selected from the activated TCI states and is indicated via a Downlink Control Information (DCI) signaling as spatial reception parameters of the Demodulation Reference Signal (DMRS) for PDSCH.

The activated downlink TCI states may be overlapped or adjacent. In such case, a User Equipment (UE) is not able to do Time/Frequency (T/F) tracking for each of Synchronization Signal/PBCH Blocks (SSBs) after processing the MAC-CE, and the UE may need an additional delay (SSB periodicity) to be able to synchronize with the SSBs. This is because the UE may be receiving the SSBs from different directions with different panels. However, when the UE is not capable of simultaneous reception with two panels, the UE needs to switch a panel to be able to synchronize with the SSBs. When the SSBs are overlapping or adjacent to each other, the UE would not have time to switch the panel fast enough to measure the SSBs on the first occasion.

SUMMARY

In a first aspect of the present disclosure, there is provided a first apparatus. The first apparatus comprises at least one processor; and at least one memory storing instructions that, when executed by the at least one processor, cause the first apparatus at least to: receive a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determine an order for performing the first switch and the second switch, the order being associated with at least one of first information about a first transmission between the first network device and the first apparatus or second information about a second transmission between the second network device and the first apparatus.

In a second aspect of the present disclosure, there is provided a second apparatus. The second apparatus comprises at least one processor; and at least one memory storing instructions that, when executed by the at least one processor, cause the second apparatus at least to: cause a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determine an order for performing the first switch and the second switch.

In a third aspect of the present disclosure, there is provided a method. The method comprises: receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch, the order being associated with at least one of first information about a first transmission between the first network device and the first apparatus or second information about a second transmission between the second network device and the first apparatus.

In a fourth aspect of the present disclosure, there is provided a method. The method comprises: causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch.

In a fifth aspect of the present disclosure, there is provided a first apparatus. The first apparatus comprises means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch, the order being associated with at least one of first information about a first transmission between the first network device and the first apparatus or second information about a second transmission between the second network device and the first apparatus.

In a sixth aspect of the present disclosure, there is provided a second apparatus. The second apparatus comprises means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments may now be described with reference to the accompanying drawings, where:

FIG. 9 illustrates a flowchart of a method implemented at a first apparatus according to some example embodiments of the present disclosure;

FIG. 10 illustrates a flowchart of a method implemented at a second apparatus according to some example embodiments of the present disclosure;

Throughout the drawings, the same or similar reference numerals represent the same or similar element.

DETAILED DESCRIPTION

Figure 1:
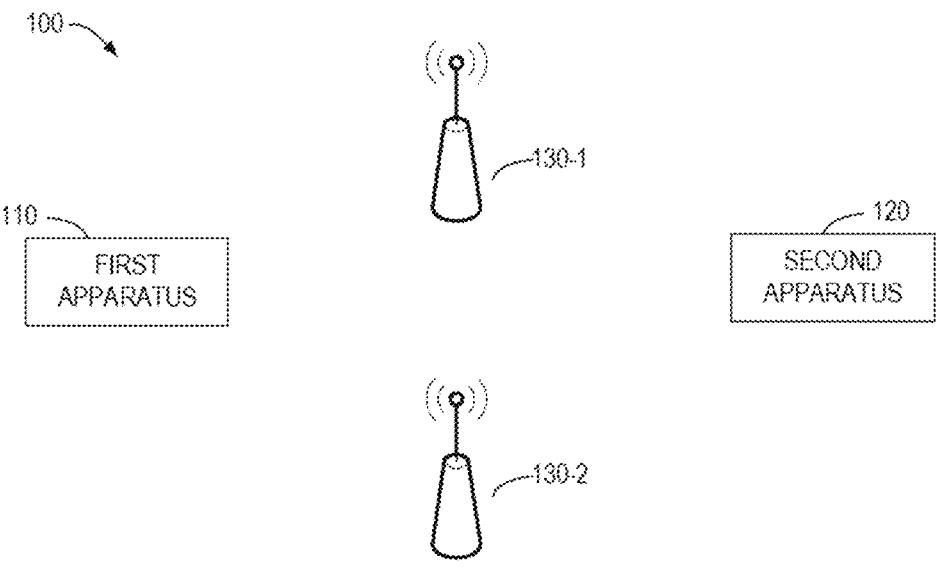
FIG. 1 illustrates an example communication environment in which example embodiments of the present disclosure can be implemented.

Principle of the present disclosure may now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It may be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there may of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Transmission Reception Point (TRP), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a user equipment (UE) toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, UE, a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain may be used as an example of a transmission resource for describing some example embodiments of the present disclosure. It is noted that example embodiments of the present disclosure are equally applicable to other resources in other domains.

FIG. 1 illustrates an example communication environment 100 in which example embodiments of the present disclosure can be implemented. It is to be understood that the elements shown in the communication environment 100 are intended to represent main functions provided within the system. As such, the blocks shown in FIG. 1 reference specific elements in communication networks that provide these main functions. However, other network elements may be used to implement some or all of the main functions represented. Also, it is to be understood that not all functions of a communication network are depicted in FIG. 1. Rather, functions that facilitate an explanation of illustrative embodiments are represented. Further, the number of the elements shown in FIG. 1 is also for the purpose of illustrative only and there may be any number of elements.

In the communication environment 100, a plurality of communication devices, including a first apparatus 110, a second apparatus 120 and network devices 130-1 and 130-2 (collectively or individually referred to as network device 130) can communicate with each other.

The second apparatus 120 has a certain coverage range, which may be called as a cell. The first apparatus 110 is located in the cell managed by the second apparatus 120. In the communication environment 100, the second apparatus 120 may communicate data and control information with the first apparatus 110.

In some example embodiments, the first apparatus 110 may act as a terminal device (e.g., a UE), the second apparatus 120 may act as a further network device (for example, a gNB) and the network devices 130-1 and 130-2 may act as network devices (for example, TRPs). A link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver). Similarly, a link from the network device 130 to the first apparatus 110 is also referred to as a downlink, while a link from the first apparatus 110 to the network device 130 is also referred to as an uplink.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time introduced. One framework is single-DCI used to support scenarios with ideal backhaul available among the TRPs, which for instance can make joint scheduling decisions. The other framework is multi-DCI used to support scenarios with non-ideal backhaul among the TRPs, where each TRP uses its own DCI to schedule downlink data transmission independently. In 3GPP Release 15 (Rel-15), transmission Configuration Indicator (TCI) states is only configured for downlink, while uplink spatial relation covers the beam indication for uplink.

Multi-TRP schemes for Physical Downlink Control Channel (PDCCH), Physical Uplink Shared Channel (PUSCH) and Physical Uplink Control Channel (PUCCH) are then focused on, although only time-division multiplexing (TDM) schemes have been defined for the uplink (UL). Then, the unified TCI state framework is specified in Rel-17, where TCI states are configured for both downlink and uplink. The configuration is either joint, where same TCI state covers both UL and DL, or separate, where separate TCI states are configured for DL and UL. Unified TCI state framework uses a common TCI state concept, where one common TCI/indicated TCI state at a time provides spatial assumption for the set of signals and channels (PDCCH, PDSCH, PUCCH, PUSCH, Channel State Information Reference Signal (CSI-RS), Sounding Reference Signal (SRS)). Assigning the unified TCI states is done with the following steps:

1. RRC-based configuration of up to 128 TCI states.
2. Media Access Control Control Element (MAC-CE)-based activation of TCI states into up to 8 codepoints in active TCI state list:
   a. If only one TCI state is activated to the active TCI state list, this also becomes the indicated TCI state.
3. DCI-based indication of a single joint TCI state or TCI state pair of DL and UL TCI states
   a. This step is only needed if there are more than one TCI state on the active TCI state list.

Then extending a unified TCI framework for indication of multiple DL and UL TCI states for multi-TRP is studied in Rel-18, where unified TCI states are used to provide Quasi Co Location (QCL) relationship to reference signals for the uplink and downlink of each TRP link, as stated in the following Table 1.

TABLE 1

| 2. Specify extension of Rel-17 Unified TCI framework for indication of multiple DL and UL TCI states focusing on multi-TRP use case, using Rel-17 unified TCI framework. |
| --- |

Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of apparatuses and their connections shown in FIG. 1 are only for the purpose of illustration without suggesting any limitation. The communication environment 100 may include any suitable number of apparatuses configured to implementing example embodiments of the present disclosure.

As discussed above, for 3rd Generation Partnership Project (3GPP) New Radio (NR) physical layer development for multi-transmission point (TRP), multi-TRP schemes have been studied and specified. Focused on Physical Downlink Shared Channel (PDSCH), two different frameworks are For MIMO evolution for downlink and uplink, unified TCI states are used in single-DCI and multi-DCI mode as described in the following.

Figure 2:
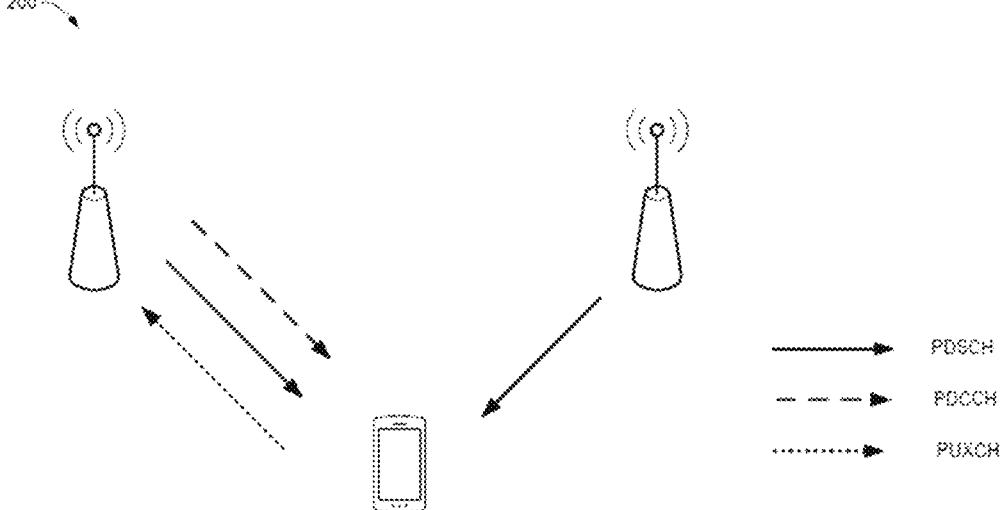
FIG. 2 illustrates a schematic diagram of a single-DCI mode.

Reference is made to FIG. 2, which illustrates a schematic diagram 200 of a single-DCI (sDCI) mode. In sDCI mode, PDSCH is scheduled from two TRPs by a single DCI on PDCCH, which is transmitted by only one of the two TRPs. Uplink transmission can be configured for each of the links.

In single-DCI mode, when unified TCI states are used, the UE is configured with a set of joint DL/UL TCI states and/or separate DL and UL TCI states. For MIMO evolution for downlink and uplink, a single MAC-CE command has been defined to activate either one or two joint DL/UL TCI states (or separate DL/UL TCI states) in max 8 codepoints to the UE's active TCI state list. A single DCI is used to indicate one of the codepoints including one or two TCI states with different QCL Type D sources to each TRP link. An example with joint DL/UL TCI states is shown in Table 2, which is an example of active TCI state list for sDCI.

TABLE 2

| Codepoint# | Joint DL/UL TCI state for TRP1 | Joint DL/UL TCI state for TRP2 |
|---|---|---|
| 0 | TCI#0 | TCI#5 |
| 1 | TCI#0 | TCI#6 |
| 2 | TCI#1 | TCI#5 |
| 3 | TCI#2 | TCI#5 |
| 4 | TCI#3 | TCI#6 |
| 5 | TCI#3 | TCI#7 |
| 6 | TCI#0 | |
| 7 | TCI#1 | |

Figure 3:
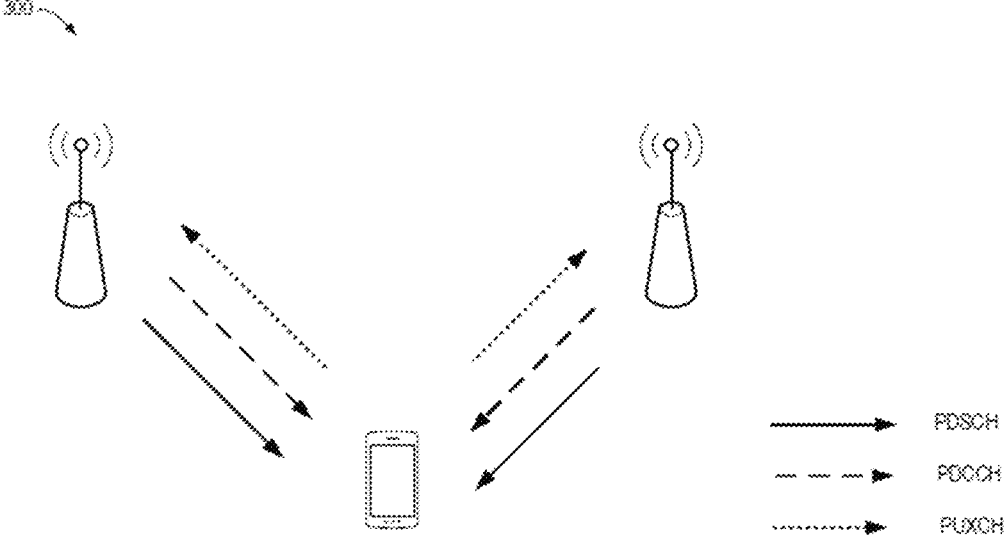
FIG. 3 illustrates a schematic diagram of a multi-DCI mode.

Reference is made to FIG. 3, which illustrates a schematic diagram 300 of a multi-DCI (mDCI) mode. In mDCI mode, PDSCH is scheduled with own DCIs on PDCCH that is transmitted by each TRP. Uplink transmission may be scheduled for both TRP links.

In the multi-DCI mode, when unified TCI states are used, similar to the single-DCI mode, the UE is configured with a set of joint DL/UL TCI states and/or separate DL and UL TCI states. Differently from the single-DCI mode, in the multi-DCI mode, separate MAC-CE commands are used for each TRP link to activate up to 8 joint DL/UL TCI states (or separate DL/UL TCI states) into max 8 codepoints to separate active TCI state lists for each TRP. Separate DCIs transmitted from each TRP are used to indicate one of the codepoints from each of the TRP specific active TCI state list. An example with joint DL/UL TCI states is shown in Table 3, which is example of active TCI state lists for multi-DCI.

TABLE 3

| Active TCI state list for TRP1 | | Active TCI state list for TRP2 | |
|---|---|---|---|
| Codepoint# | Joint DL/UL TCI state | Codepoint# | Joint DL/UL TCI state |
| 0 | TCI#0 | 0 | TCI#8 |
| 1 | TCI#1 | 1 | TCI#9 |
| 2 | TCI#2 | 2 | TCI#10 |
| 3 | TCI#3 | 3 | TCI#11 |
| 4 | TCI#4 | 4 | TCI#12 |
| 5 | TCI#5 | 5 | TCI#13 |
| 6 | TCI#6 | 6 | TCI#14 |
| 7 | TCI#7 | 7 | TCI#15 |

TCI state switching delay requirements for unified TCI states are defined for downlink and for uplink. The requirements define the delay within which the UE shall be able to complete MAC-CE based TCI state activation. The MAC-CE based TCI state activation is defined for DL and UL.

MAC-CE based TCI state activation is performed after receiving an MAC-CE command to activate one or more TCI states to the active TCI state list. During the MAC-CE activation delay, the UE will perform fine time/frequency tracking using the first Synchronization Signal and PBCH block (SSB) with the correct QCL relationship after the UE has processed the MAC-CE command.

When a target TCI state is known, for DL TCI state, the UE shall be able to receive using the target TCI state after a certain slot specified in the follow Table 4.

TABLE 4

If the target TCI state is known, upon receiving PDSCH carrying MAC-CE activation command in slot n, UE shall be able to receive UE-dedicated PDCCH/PDSCH with target TCI state of the serving cell on which TCI state switch occurs at the first slot that is after slot $n+ T_{HARQ} + 3N_{slot}^{subframe, \mu} + TO_k*(T_{first-SSB} + T_{SSB-proc})$ / NR slot length. The UE shall be able to receive UE-dedicated PDCCH/PDSCH with the old TCI state until slot $n+ T_{HARQ} + 3N_{slot}^{subframe, \mu}$ where $T_{HARQ}$ (in slot) is the timing between DL data transmission and acknowledgement as specified in TS 38.213 [3];

- $T_{first-SSB}$ is time to first SSB transmission after the MAC CE command is decoded by the UE; and the SSB shall be the QCL-TypeA or QCL-TypeC to the target TCI state
- $T_{SSB-proc} = 2$ ms;
- $TO_k = 1$ if target TCI state is not in the active TCI state list for PDSCH/PDCCH, 0 otherwise.

When the target TCI state is unknown, an additional layer 1 Reference Signal Receiving Power (L1-RSRP) measurement period is added in the delay, as shown in the Table 5.

TABLE 5

If the target TCI state is unknown, upon receiving PDSCH carrying MAC-CE activation command in slot n, UE shall be able to receive UE-dedicated PDCCH/PDSCH with target TCI state of the serving cell on which TCI state switch occurs at the first slot that is after slot n+ $T_{HARQ}$ + $3N_{slot}^{subframe, \mu}$ + ($T_{L1-RSRP}$ +$TO_{uk}$*($T_{first-SSB}$+ $T_{SSB-proc}$)) / NR slot length. The UE shall be able to receive UE-dedicated PDCCH/PDSCH with the old TCI state until slot n+ $T_{HARQ}$ + $3N_{slot}^{subframe, \mu}$.

Where

- $T_{L1-RSRP}$ = 0 in FR1 or when the TCI state switching not involving QCL-TypeD in FR2. Otherwise,
- $T_{L1-RSRP}$ is the time for Rx beam refinement in FR2, defined as
- $T_{L1-RSRP\_Measurement\_Period\_SSB}$ for SSB as specified in clause 9.5.4.1,
    - with the assumption of M=1
    - with $T_{Report}$ = 0
- $T_{L1-RSRP\_Measurement\_Period\_CSI-RS}$ for CSI-RS as specified in clause 9.5.4.2
- CSI-RS based L1-RSRP measurement only apply for TCI state switch when source RS is associated with serving cell
    - configured with higher layer parameter repetition set to ON
    - with the assumption of M=1 for periodic CSI-RS
    - for aperiodic CSI-RS if number of resources in resource set at least equal to MaxNumberRxBeam
    - with $T_{Report}$ = 0
- $TO_{uk}$ = 1 for CSI-RS based L1-RSRP measurement, and 0 for SSB based L1-RSRP measurement when TCI state switching involves QCL-TypeD
- $TO_{uk}$ = 1 when TCI state switching involves other QCL types only
- $T_{first-SSB}$ is time to first SSB transmission after L1-RSRP measurement when TCI state switching involves QCL-TypeD;
- $T_{first-SSB}$ is time to first SSB transmission after MAC CE command is decoded by the UE for other QCL types;
- The SSB shall be the QCL-TypeA or QCL-TypeC to target TCI state TCI state is known under the following conditions as shown in Table 6.

TABLE 6

8.15.2 Known conditions for downlink TCI state

The downlink TCI state is known if the following conditions are met:

- During the period from the last transmission of the RS resource used for the L1-RSRP measurement reporting for the target downlink TCI state to the completion of active downlink TCI state switch, where the RS resource for L1-RSRP measurement is the RS in target downlink TCI state or QCLed to the target downlink TCI state
- Downlink TCI state switch command is received within 1280 ms upon the last transmission of the RS resource for beam reporting or measurement
- The UE has sent at least 1 L1-RSRP report for the target downlink TCI state before the downlink TCI state switch command
- The target downlink TCI state remains detectable during the downlink TCI state switching period
- The SSB associated with the downlink TCI state remain detectable during the downlink TCI switching period
    - SNR of the downlink TCI state ≥ −3dB
    - The SSB can be associated with either the serving cell PCI or a PCI different from serving cell PCI.

Otherwise, the downlink TCI state is unknown.

For MIMO evolution for downlink and uplink in Rel-18, TCI state switching requirements is defined for switching of two TCI states with different QCL Type D sources with a single MAC-CE command in single-DCI mode and with two separate MAC-CEs in multi-DCI mode.

It is agreed to define the requirements under the assumption that the UE is not capable of simultaneous downlink reception or uplink transmission. The latest agreements are captured and are described below in Table 7. It is noted that, the "cases" mentioned in the sDCI issues are as follows:

Case1: If both target TCIs are known;

Case 2: If one of target TCIs is unknown and another is known;

Case 3: If both target TCIs are unknown.

TABLE 7

| <Topic 3 Unified TCI Framework extended to M-TRP> |
| --- |

Issue 3-1-1: For sDCI mTRP, how to specify DL MAC CE based dual TCI state switch the switching delay requirements for Case 1, if SSB are adjacent in FR2?

Agreement:

The SSB periodicity is the same for serving cell

- $T_{HARQ} + 3N_{slot}^{subframe, \mu} + \max \{TO_{k1}*(T_{first-SSB1} + AD_1*T_{SSB1} + T_{SSB-proc}), TO_{k2}*(T_{first-SSB2} + AD_2*T_{SSB2} + T_{SSB-proc})\}$ / NR slot length
  - $AD_1 = 1$ if SSBs are adjacent in FR2 and $T_{SSB1} = T_{SSB2}$ ; 0 otherwise
  - $AD_2 = 1$ if SSBs are adjacent in FR2 and $T_{SSB2} = T_{SSB1}$ ; 0 otherwise Issue 3-1-2: For sDCI mTRP, how to specify DL MAC CE based dual TCI state switch the switching delay requirements for Case 2, if SSB are adjacent in FR2?

Agreement:

- $(T_{SSB1} = T_{SSB2})$: $T_{HARQ} + 3N_{slot}^{subframe, \mu} + T_{L1-RSRP1} + \max \{TO_{uk1}*(T_{first-SSB1} + AD_1*T_{SSB1} + T_{SSB-proc}), TO_{k2}*(T_{first-SSB2} + T_{SSB-proc})\}$ / NR slot length; $AD_1 = 1$ if SSBs are adjacent in FR2; 0 otherwise Issue 3-1-3: For sDCI mTRP, how to specify DL MAC CE based dual TCI state switch the switching delay requirements for Case 3, if SSB are adjacent in FR2?

Way forward:

- Option 1:
  - Longer delay is expected
- Option 2:
  - Additional SSB can be added in the MAC-CE based TCI state switching Issue 3-1-4: For sDCI mTRP, end point of dual TCI state switch delay requirements?

Agreement:

- Dual TCI state switch requirements for sDCI are defined for the case when UE is expected to receive PDCCH/PDSCH from both TCI states/ TRPs after the switch.

Issue 3-1-5 For sDCI mTRP, active TCI state list update delay

Agreement:

- For the case of overlapping/adjacent SSB in FR2, additional SSB can be added in active TCI state list update delay Issue 3-1-7-a For mDCI mTRP, how to specify DL TCI state switching requirements for eUTCI if UE not supporting two TAs?

Agreement:

- [Known]: $T_{HARQ} + 3N_{slot}^{subframe, \mu} + TO_k*(T_{first-SSB} + T_{SSB-proc} + OL*T_{SSB})$
- [Unknown]: $T_{HARQ} + 3N_{slot}^{subframe, \mu} + TL_{1-RSRP} + TO_{uk}*(T_{first-SSB} + T_{SSB-proc} + OL*T_{SSB})$
- OL=1 if SSB overlaps or adjacent to SSB from other TRP in FR2 and SSB periodicity is less than that of other TRP, 0 otherwise Issue 3-1-7-b For mDCI mTRP, how to specify UL TCI state switching requirements for eUTCI if UE not supporting two TAs?

Agreement:

- Rel-17 unified TCI state switching requirements are applicable for each TCI state associated with coresetPoolIndex independently Issue 3-1-8-a: For mDCI mTRP, how to specify DL TCI state switching requirements for eUTCI if UE supporting two TAs and but not supporting RTD>CP?

Agreement:

- [Known]: $T_{HARQ} + 3N_{slot}^{subframe, \mu} + TO_k*(T_{first-SSB} + T_{SSB-proc} + OL*T_{SSB})$
- [Unknown]: $T_{HARQ} + 3N_{slot}^{subframe, \mu} + TL_{1-RSRP} + TO_{uk}*(T_{first-SSB} + T_{SSB-proc} + OL*T_{SSB})$
- OL=1 if SSB overlaps or adjacent to SSB from other TRP in FR2 and SSB periodicity is less than that of other TRP, 0 otherwise Issue 3-1-8-b: For mDCI mTRP, how to specify UL TCI state switching requirements for eUTCI if UE supporting two TAs and but not supporting RTD>CP?

Way forward:

- Option 1:
  - [Known case] $T_{HARQ} + 3N_{slot}^{subframe, \mu} + TO_{k-ref}(T_{first-SSB-DLRef} + 2ms) + NM*(T_{first-PL-RS} + 4*T_{target\_PL-RS} + 2ms)$
  - [Unknown case]: $T_{HARQ} + 3N_{slot}^{subframe, \mu} + TL_{1-RSRP} + TO_{uk-ref}(T_{first-SSB-DLRef} + 2ms) + T_{first-PL-RS} + 4*T_{target\_PL-RS} + 2ms$
- Option 2:
  - Rel-17 unified TCI state switching requirements are applicable for each TCI state associated with coresetPoolIndex independently
  - [Known case] $T_{HARQ} + 3N_{slot}^{subframe, \mu} + NM*(T_{first\_target-PL-RS} + 4*T_{target\_PL-RS} + 2ms)$
  - [Unknown case]: $T_{HARQ} + 3N_{slot}^{subframe, \mu} + TL_{1-RSRP} + T_{first\_target-PL-RS} + 4*T_{target\_PL-RS} + 2ms$ Issue 3-1-9-a: For mDCI mTRP, how to specify DL TCI state switching requirements for eUTCI if UE supporting two TAs and supporting RTD>CP in FR1?

Agreement:

- Rel-17 unified TCI state switching requirements are applicable for each TCI state associated with coresetPoolIndex independently Issue 3-1-9-b: For mDCI mTRP, how to specify UL TCI state switching requirements for eUTCI if UE supporting two TAs and supporting RTD>CP in FR1?

TABLE 7-continued

<Topic 3 Unified TCI Framework extended to M-TRP>

Way forward:
* Option 1:
  ○ [Known case] $T_{HARQ} + 3N_{slot}^{subframe, \mu} + TO_{k\text{-}ref} (T_{first\text{-}SSB\text{-}DLRef} + 2ms) + NM*( T_{first\text{-}PL\text{-}RS} + 4*T_{target\_PL\text{-}RS} + 2ms)$
  ○ [Unknown case]: $T_{HARQ} + 3N_{slot}^{subframe, \mu} + T_{L1\text{-}RSRP} + TO_{uk\text{-}ref} (T_{first\text{-}SSB\text{-}DLRef} + 2ms) + T_{first\text{-}PL\text{-}RS} + 4*T_{target\_PL\text{-}RS} + 2ms$
* Option 2:
  ○ Rel-17 unified TCI state switching requirements are applicable for each TCI state associated with coresetPoolIndex independently
  ○ [Known case] $T_{HARQ} + 3N_{slot}^{subframe, \mu} + NM*( T_{first\_target\text{-}PL\text{-}RS} + 4*T_{target\_PL\text{-}RS} + 2ms)$
  ○ [Unknown case]: $T_{HARQ} + 3N_{slot}^{subframe, \mu} + T_{L1\text{-}RSRP} + T_{first\_target\text{-}PL\text{-}RS} + 4*T_{target\_PL\text{-}RS} + 2ms$
Issue 3-1-10 For mDCI mTRP, active TCI state list update delay
Agreement:
* For the case of overlapping/adjacent SSB in FR2, additional SSB can be added in active TCI state list update delay
Issue 3-1-11: L1-RSRP measurement when RTD>CP
Agreement:
* Define requirements for FR1 for intra/inter-cell.
* For FR1, if UE supports RTD>CP, reuse Rel-17 L1-RSRP measurement period in 9.13 for a cell with different PCI from serving cell, remove the RTD is smaller than CP side condition. Reuse L1-RSRP measurement period in 9.5 for serving cell.
* If UE does not support RTD>CP, for RTD is larger than CP, no requirements.
* FFS on scheduling/measurement restriction for different SCS and TDD.
Issue 3-1-12: L1-RSRP measurement for resource type of mTRP for a cell with different PCI from serving cell
Agreement:
SSB only, no CSI-RS In legacy solutions, such as the TCI state switching delay requirements and the relevant agreements in 3GPP MIMO evolution as described above, it has agreed that in sDCI (Issue 3-1-1) when the SSBs which are used for fine time/frequency (T/F) tracking for the two activated downlink TCI states are overlapping (completely or partially in time domain), or adjacent (that is, when the distance between the end of the first SSB1 and the beginning of the first SSB2 is less than X ms/symbols, e.g. X=1 symbol), the UE is able to do the T/F tracking for each of the first SSBs after processing the MAC-CE, but the UE would need an additional delay (SSB periodicity) to synchronize with both SSBs. This is because the UE may be receiving the two first SSBs from different directions with different panels, and when the UE is not capable of simultaneous reception with two panels, the UE would need to switch the panel to synchronize with both SSBs. When the SSBs are overlapping or adjacent to each other, the UE would not have time to switch the panel so fast that it would be able to measure both SSBs on the first occasion (overlapping or adjacent).

Figure 4:
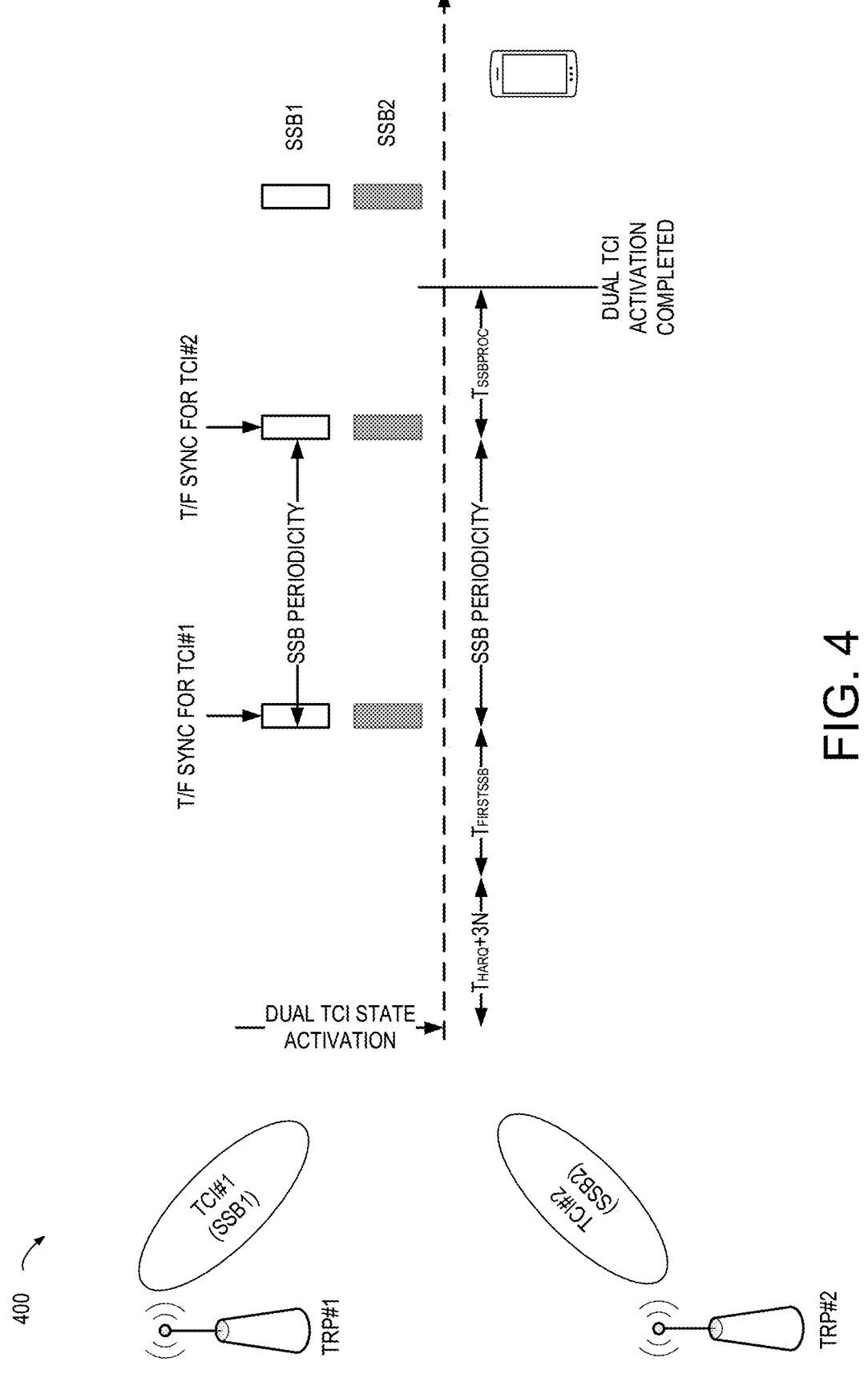
FIG. 4 illustrates a schematic diagram of TCI state switching delay in single-DCI mode.

This is illustrated in FIG. 4, which shows a schematic diagram 400 of TCI state switching delay in single-DCI mode. The UE is switching to TCI state #1 and #2. The UE synchronizes first with SSB1 with QCL relationship to TCI state #1 but is not able to measure SSB2 which is overlapping with SSB1 in the first occasion. Therefore, the UE has to wait for a whole SSB periodicity to synchronize with SSB2 which has a QCL relationship to TCI state #2.

Figure 5:
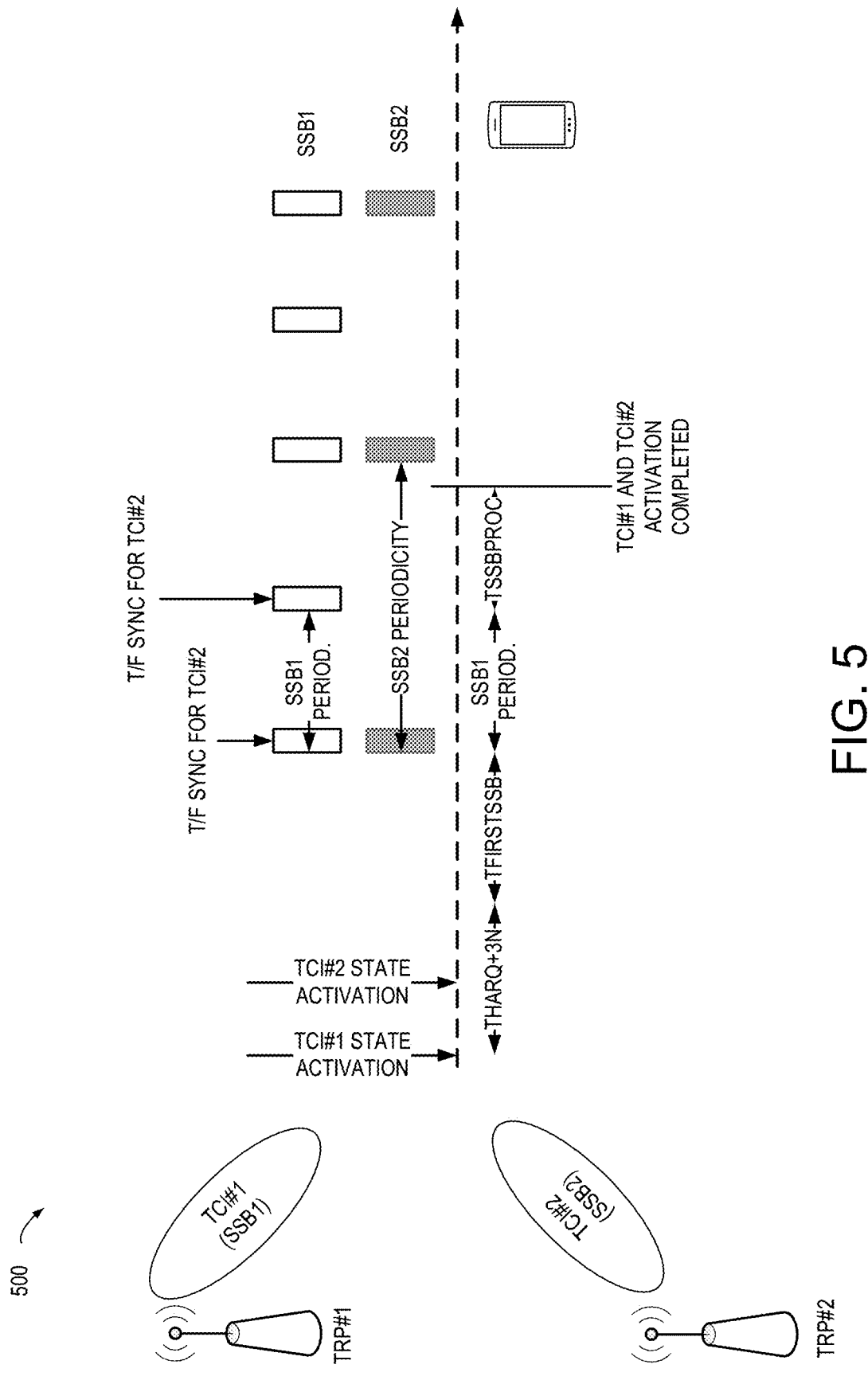
FIG. 5 illustrates a schematic diagram of TCI state switching delay in multi-DCI mode.

Similarly for mDCI, although the two TCI states (associated to the two TRPs) are activated separately, i.e. with two different MAC-CEs, it can still happen that they are activated separately from the two TRPs at very close by time, and a baseline UE (Issues 3-1-7-a and 3-1-8-a) is as well not able to do the T/F tracking for each of the first SSBs after processing the MAC-CEs when the SSBs are overlapping or adjacent. Furthermore, differently from sDCI, in mDCI SSB periodicity can be different between SSB1 and SSB2 (as intra-cell has been in the focus of sDCI) and, for that purpose, it is agreed that the additional SSB periodicity delay for a TRP is added if such SSB periodicity is less than that of other TRP. This aspect makes sure that, for example as shown in FIG. 5 (which shows a schematic diagram 500 of TCI state switching delay in multi-DCI mode), if SSB1 periodicity is smaller than SSB2 periodicity, the UE first does the T/F tracking for SSB2, waits one SSB1 periodicity, and then does the T/F tracking for SSB1, such that the whole TCI switching delay is minimized. In our understanding, in case SSB1 and SSB2 periodicities are the same, the "less than that" above can be read as "not greater than that", meaning that the UE can decide autonomously for which SSB to do the T/F tracking first.

With such framework, for both sDCI and mDCI scenarios, in case of same SSB periodicity, one SSB periodicity is added as a requirement for both TCI states. On the other hand, as we explained above, in practice, one TCI switch will be completed first, and the other later after that SSB periodicity, but which will be completed first is not known at the network, and, in current specifications, left up to the UE implementation.

Such solution is sub-optimal because we may have benefits at the network side in knowing such information, i.e., in knowing which TCI state will be switched first.

An initial solution in which a rule that the UE has to follow has been proposed, e.g., in the form of an "anchor link" that defines which TCI state the UE must switch first. In a solution, some options are defined, for example using the coresetPoolIndex to indicate a specific "anchor link". However, there are two limitations in the solution. One limitation is that the options defined there are not based on any performance metric, i.e., they do not depend on e.g. network load or channel conditions, and somehow setting which TCI state is switched first is not optimized in any way. The other limitation is that the options are "static" mechanisms, that is, there is no dynamic method that network and UE can for instance use to re-define the "anchor link" based on e.g. network load or channel conditions.

According to some example embodiments of the present disclosure, a solution for TCI activation in mTRP is proposed. In the solution, a UE receives a first indication indicating a first switch from a first source transmission configuration indicator (TCI) state to a first target TCI state is to be performed and a second indication indicating a second switch from a second source TCI state to a second target TCI state is to be performed. Then, the UE determines an order for performing the first switch and the second switch.

For example, assuming that the UE still decides which TCI state is switched first but the networks knows about that, the network could use such information to avoid, for instance in sDCI, doing this dual switching in certain conditions, such as, if the network knows that UE will switch first TRP1 and then TRP2, but a link UE-TRP2 is getting worse faster than a link UE-TRP1 (and the network knows about that due to, e.g., L1-RSRP reporting from the UE), the network would prefer to have TRP2 to be switched earlier than TRP1. In such case, the network could first switch the TCI for TRP2 and when such switching is completed, switch the TCI for TRP1.

The core of this solution is to introduce a rule, such that UE and network know which TCI state will be activated/switched first in case overlapping/adjacent SSBs for both sDCI and mDCI mTRP, with the TCI state that will be activated/switched first being selected based on parameters related to the UE link(s) reliability. We propose a few options for such parameters in this solution to define which TCI state of the following should be activated/switched first:

i. The TCI state for which a worse link quality has been measured.
    ii. The TCI state for which a better link quality has been measured.
    iii. The TCI state associated to the TRP for which a lower power headroom report (PHR) is reported.
    iv. The TCI state associated to the TRP for which a higher PHR is reported.

Example embodiments of the present disclosure will be described in detail below with reference to the accompanying drawings.

Figure 6:
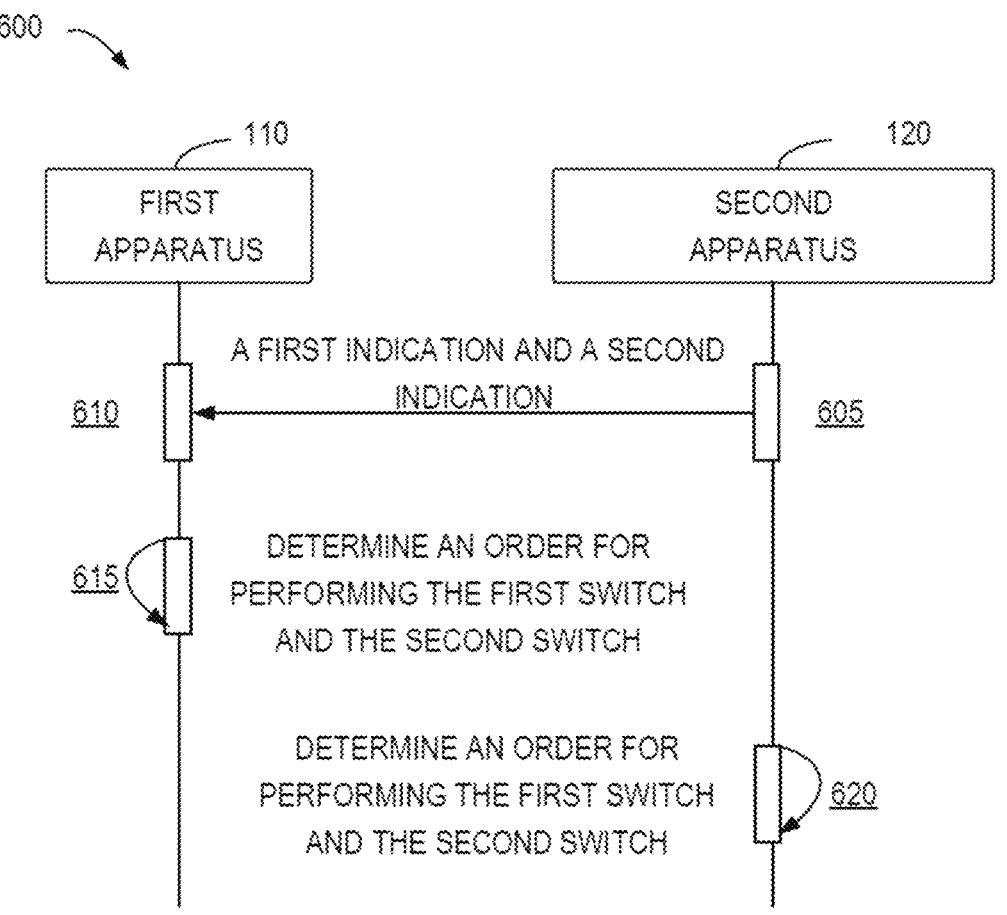
FIG. 6 illustrates a signaling flow for TCI activation in multi-transmission and receiving point (mTRP) according to some example embodiments of the present disclosure.

FIG. 6 illustrates a signaling flow 600 for TCI activation in mTRP according to some example embodiments of the present disclosure. For the purposes of discussion, the signaling flow 600 will be discussed with reference to FIG. 1. The signaling flow involves a first apparatus 110 and a second apparatus 120. For the purpose of illustration, some example embodiments may be described with the first apparatus 110 operating as a terminal device (for example, a UE) and the second apparatus 120 operating as a network device (for example, a gNB or a TRP).

The second apparatus 120 causes a first indication and a second indication to be transmitted (605) to the first apparatus 110. The first apparatus 110 receives (610) the first indication and the second indication. The first indication indicates a first switch from a first source TCI state to a first target TCI state is to be performed and the second indication indicates a second switch from a second source TCI state to a second target TCI state is to be performed. The first source TCI state has been activated for a first network device and the second source TCI state has been activated for a second network device. That is, the first network device and the second network device may be TRPs, respectively. In such case, reference signals associated with the first target TCI state and the second target TCI state are adjacent. In some example embodiment, the reference signals may include SSBs, for example.

It is to be understood that the first network device and second first network device discussed here may be the same TRP, that is, there is only one single TRP, or may be different TRPs, that is, there are multiple TRPs. Although some example embodiments of the present disclosure take the multiple TRP scenario as an example, it is just for purpose of illustration, rather suggesting any limitations. Note that the single TRP is also appliable for example embodiments of the present disclosure.

The first indication and the second indication may be transmitted from the first network device and the second network device, respectively. Alternatively, the first indication and the second indication may be both transmitted from the first network device, or both transmitted from the second network device. As a further alternative, the first indication and the second indication may be transmitted from the second apparatus 120. In some example embodiments, the second apparatus 120 may cause the first indication and the second indication to be transmitted from one of or both of the first network device and the second network device, or transmit the first indication and/or the second indication by itself.

In some example embodiments, the first indication and the second indication may be a single indication instead of two separate indications. TCI #1 may be an example of the first source TCI state and TCI #3 may be an example of the first target TCI state. TCI #2 may be an example of the second source TCI state and TCI #3 may be an example of the second target TCI state. In this case, the first apparatus 110 may receive a dual TCI switching command by the network via a MAC-CE, to switch from TCI #1 to TCI #3 for the first network device and from TCI #2 to TCI #4 for the second network device.

In some example embodiments, the first apparatus 110 may receive the first indication and the second indication in a single MAC CE command from one of the first network device and the second network device. This may be directed to the sDCI mode. Alternatively, the first apparatus 110 may receive the first indication in a MAC CE command from the first network device and the second indication in a further MAC CE command form the second network device. This may be directed to the mDCI mode.

The first apparatus 110 then determines (615) an order for performing the first switch and the second switch. The order is associated with at least one of first information about a first transmission between the first network device and the first apparatus 110 or second information about a second transmission between the second network device and the first apparatus 110.

In some example embodiments, the first information may include, for example but not limited to, a metric of a link quality of the first transmission and/or a metric of power headroom of the first network device. The second information may include, for example but not limited to, a metric of a link quality of the second transmission and/or a metric of power headroom of the second network device. Further, the metric of the link quality may include, for example but not limited to, Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and so on. The metric of power headroom may include a Power Headroom Report (PHR).

In further example embodiments, the first apparatus 110 may obtain measurements of metrics of a link quality associated with the first network device and the second network device. Then, the first apparatus 110 may determine the order based on a first metric of a link quality of the first transmission and a second metric of a link quality of the second transmission. The determination may be made based on the measurements.

If the first metric of a link quality of the first transmission is better than the second metric of a link quality of the second transmission, the first apparatus 110 may determine that the order as performing the second switch before the first switch. In such case, the last measurement report (Layer 1 (L1) or Layer 3 (L3)) for RSRP, RSRQ, RSSI and/or SINR is considered. For example, a rule may be defined based on the last UE RSRP reporting, such that the TCI state with a worse link quality is activated/switched first, which can be useful if it is expected to lose no link at all. Alternatively, a rule may be defined based on the last UE RSRP reporting, such that the TCI state with a better link quality is activated/switched first, which can be useful if at least one link is expected to stay good even if the other link may be lost.

In alternative example embodiments, the first apparatus 110 may obtain measurements of metrics of a link quality associated with the first network device and the second network device. Then, the first apparatus 110 may determine, based on the measurements, a first prediction result and a second prediction result. The first prediction result is associated with an assumption that the first switch is performed before the second switch, and a second prediction result is associated with an assumption that the second switch is performed before the first switch. The determination regarding to which TCI state needs to be switched/activated first is based on the first prediction result and the second prediction result.

If all metrics of the link quality in the first prediction result are larger than those in the second prediction result, the first apparatus 110 may determine that the order as performing the first switch before the second switch. If all metrics of the link quality in the first prediction result are less than those in the second prediction result, the first apparatus 110 may determine that the order as performing the first switch before the second switch.

Alternatively, if a degrading speed of metrics of the link quality in the first prediction result is less than that in the second prediction result, the first apparatus 110 may determine that the order as performing the first switch before the second switch. If accordance with a determination that the degrading speed of metrics of the link quality in the first prediction result is greater than that in the second prediction result, the first apparatus 110 may determine that the order as performing the first switch before the second switch. In some example embodiments, the order may be determined based on a set of the last measurement reports (L1 and L3), still considering metrics like RSRP, RSRQ, RSSI and SINR, and considering for example variations of such metrics at the same time. In such example embodiments, a rule can be defined based on UE RSRP reporting, such that the TCI state whose link quality is degrading either faster or slower is activated/switched first.

Specifically, some example embodiments are provided herein on how the first apparatus 110 can decide which TCI state is to be activated/switched first for a scenario where the first apparatus 110 is configured with DL mTRP and needs to switch from TCI #1 to TCI #3 for the first network device and from TCI #2 to TCI #4 for the second network device. The first apparatus 110 may monitor the RSRPs over last N measurement occasions for both TCI #1 and TCI #2, with N>=2. The RSRPs are denoted as $RSRP_{TCI\ \#1,1}$, . . . , $RSRP_{TCI\ \#1,N}$ for TCI#1 and $RSRP_{TCI\ \#2,1}$, . . . , $RSRP_{TCI\ \#2,N}$ for TCI #2 respectively. In addition to RSRP, other metrics may be used, for example RSRQ, RSSI or SINR. It is also noted that a different number N of measurements may be used for TCI #1 and TCI #2, that is, $N_{TCI\ \#1}$ and $N_{TCI\ \#2}$.

The first apparatus 110 then may compute a metric that relates to a variation of the RSRP for both TCI #1 and TCI #2. In such case, a liner interpolation may be considered. A difference between the first and the last measurements may be considered. More advanced estimation methods may also be used, such as polynomial or spline interpolation.

The first apparatus 110 may determine/predict a RSRP degradation for the case that TCI #1 is to be switched first, i.e.

$$\left[RSRP_{TCI\#1,pred}^{TCI\#1,first}, RSRP_{TCI\#2,pred}^{TCI\#1,first}\right].$$

The first apparatus 110 may also determine/predict a RSRP degradation for the case that TCI #2 is to be switched first, i.e.

$$\left[RSRP_{TCI\#1,pred}^{TCI\#2,first}, RSRP_{TCI\#2,pred}^{TCI\#2,first}\right].$$

Expressions $$RSRP_{k,pred}^{x,first}$$

represent the RSRP predicted for TCI #k (wherein "pred" represents predicted) assuming that TCI #x is switched first ("first" represents switched first). If TCI #1 is switched first, the value of $$RSRP_{TCI\#2,pred}^{TCI\#1,first}$$

is predicted 1 SSB period after the time of $$RSRP_{TCI\#1,pred}^{TCI\#1,first}.$$

Figure 7:
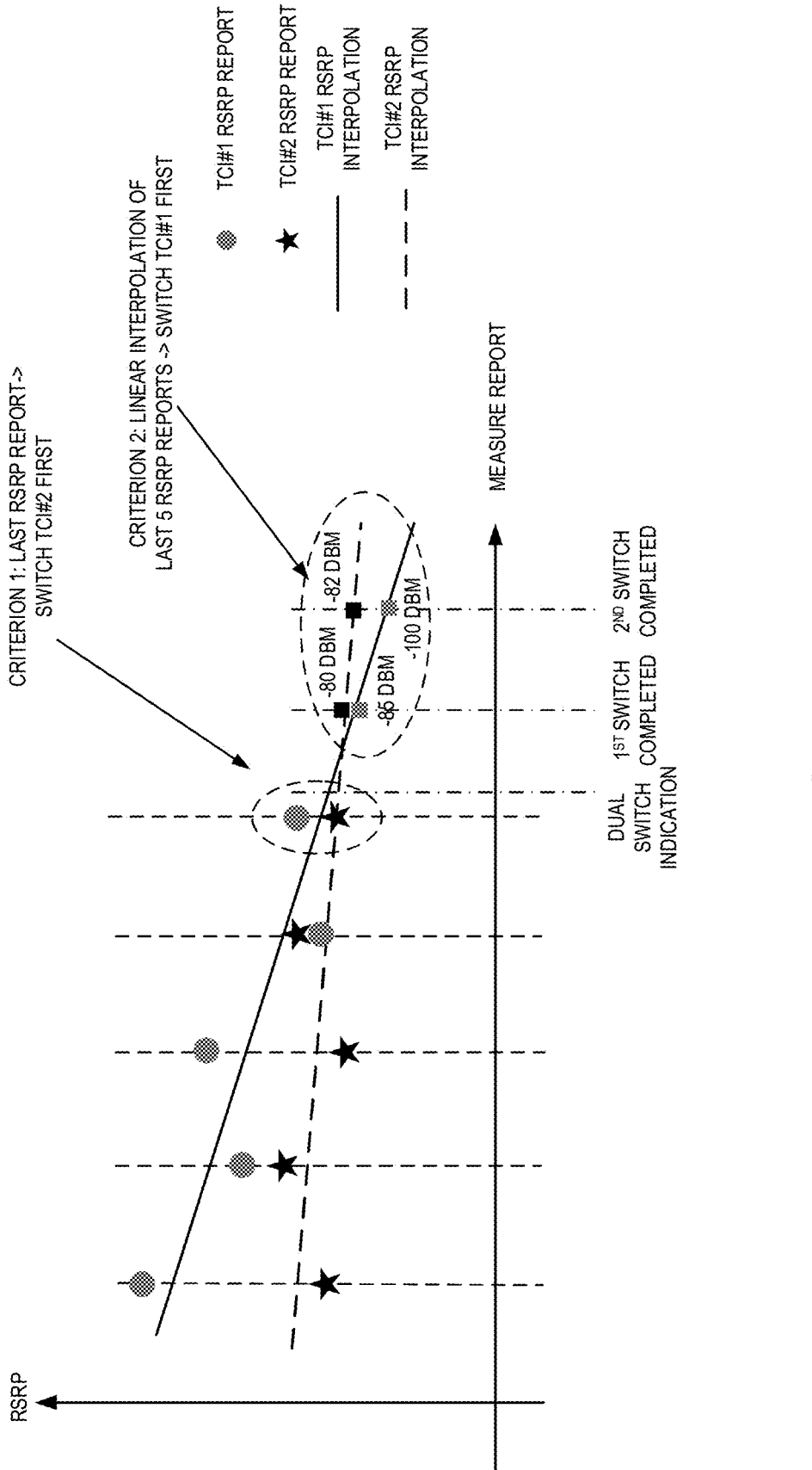
FIG. 7 illustrates a schematic diagram of different TCI state selection criteria according to some example embodiments of the present disclosure.

To explain better, reference is made to FIG. 7, which illustrates a schematic diagram of different TCI state selection criteria according to some example embodiments of the present disclosure. As shown in FIG. 7, $$RSRP_{TCI\#1,pred}^{TCI\#1,first} = -85 \text{ dBm}, RSRP_{TCI\#2,pred}^{TCI\#1,first} = -82 \text{ dBm},$$

$$RSRP_{TCI\#1,pred}^{TCI\#2,first} = -100 \text{ dBm and } RSRP_{TCI\#2,pred}^{TCI\#2,first} = -80 \text{ dBm}.$$

The first apparatus 110 may select, based on such determination/prediction, which TCI state is to be activated/switched first. UE may select to switch a TCI state first with the objective function of maximizing the minimum predicted RSRP for TCI #1 or TCI #2, as the following equation:

$$\underset{x \in \{TCI\#1, TCI\#2\}}{\operatorname{argmax}} \underset{k \in \{TCI\#1, TCI\#2\}}{\min} RSRP_{k,pred}^{x,first}$$

The objective function is designed such that the worst RSRP before the second TCI switch is completed is maximized.

Alternatively, the first apparatus 110 may select to switch a TCI first with the objective function of maximizing the mean of the predicted RSRPs among TCI #1 or TCI #2, as the following equation:

$$\underset{x \in \{TCI\#1, TCI\#2\}}{\mathrm{argmax}} \left( RSRP^{x,first}_{TCI\#1,pred} + RSRP^{x,first}_{TCI\#2,pred} \right)/2$$

Referring to FIG. 7 again, which illustrates a schematic diagram of different TCI state selection criteria according to some example embodiments of the present disclosure, the RSRP reports for both TCI #1 and TCI #2 are shown. Criterion 1 that selects the TCI to be switched first is based on the last RSRP measurement report. In this example, as the last RSRP measurement for TCI #2 is smaller than the last RSRP measurement for TCI #1, TCI #2 is selected. Criterion 2 that selects the TCI to be switched first based on a linear interpolation of the last 5 RSRP measurement reports. In this example, as the RSRP for TCI #1 is degrading faster than the RSRP for TCI #2, TCI #1 is selected. Other criteria may also be considered for the selection. After that, the first apparatus 110 may inform the second apparatus 120 about such selection, i.e., about which TCI will be activated/switched first, e.g., via MAC-CE.

In the example embodiments described above, the measurements may be obtained from one or more measurement reports about at least one of the first transmission and the second transmission.

In some example embodiments, in addition to the first information and the second information, power headroom may be used as a metric. The first apparatus 110 may obtain a first metric of power headroom of the first network device and a second metric of power headroom of the second network device. Then, the first apparatus 110 may determine the order based on the first metric of power headroom and the second metric of power headroom.

In further example embodiments, if the first metric of power headroom is larger than the second metric of power headroom, the first apparatus 110 may determine that the order as performing the first switch before the second switch. Alternatively, if the first metric of power headroom is larger than the second metric of power headroom, the first apparatus 110 may determine that the order as performing the second switch before the first switch. In such example embodiments, the first metric of power headroom may be determined based on at least one Power Headroom Report (PHR) associated with the first network device and the second metric of power headroom is determined based on at least one PHR associated with the second network device.

Specifically, a rule can be defined based on the last PHR. If a higher PHR is available at the first apparatus 110 for a transmission toward the first network device rather than the second network device, that is, if a lower UL power is used for the first network device, the first network device may be closer in distance to the first apparatus 110 with respect to the second network device, which potentially indicates a better link toward the first network device. In such case, a rule may be defined such that the TCI state associated to the network device for which a lower PHR is available (i.e., the second network device in the example above) is activated/switched first (targeting to lose no links). Alternatively, a rule may be defined such that the TCI state associated to the network device for which a higher PHR is available (i.e., the first network device in the example above) is activated/switched first (allowing to lose a weaker link). In other example embodiment, a rule may be defined based on a set of the last PHRs, implementing similar criteria to the ones described for the link quality.

Besides the metrics of link quality and the power headroom, the order may be determined based on whether the downlink control channel is carried. In some example embodiment, based on the first information and the second information, the first apparatus 110 may determine information about which of the first network device and the second network device carries the downlink control channel. Then, the first apparatus 110 may determine the order based on the determined information. In further example embodiments, if the first network device is associated with the downlink control channel, the first apparatus 110 may determine that the order as performing the first switch before the second switch.

For example, in the sDCI mode, the network device associated to the TCI state carrying PDCCH may be considered as the most important, as it schedules also data from the other network device. In this sense, it is important to protect such network device from potential link degradation. In the sDCI mode in FIG. 4, the TRP #1 may carry the PDCCH. If the channel becomes bad between the UE and TRP #2 not carrying the PDCCH, the UE may just lose data from that TRP #2. If the channel becomes bad between the UE and TRP #1 carrying the PDCCH, the UE may lose data from both TRPs, as the UE may not be able to decode the DCI sent by TRP #1 that schedules the DL transmission from both TRPs.

When a switch indication is received by the first apparatus 110 in the sDCI mode, both TCI states need to be switched. A rule is defined that determines the order based one any of the link quality or the PHR described above and the rules consider that a TCI state carrying the PDCCH is the most important at the same time.

In such case, a link quality of the downlink control channel may be lower than a first threshold. Alternatively, a link quality of a channel other than the downlink control channel may be above a second threshold. Specifically, if the PDCCH link quality is above a certain first threshold, the order may be determined based on any of the link quality or the PHR described above, otherwise the TCI state associated to the PDCCH link is activated/switched first. In alternative example embodiments, if the non-PDCCH link quality is below a second threshold, the order may be determined based on any of the link quality or the PHR described above, otherwise the TCI state associated to the PDCCH link is activated/switched first.

In example embodiments, the first apparatus may include a terminal device. The second apparatus may include a network device.

In example embodiments, besides the first apparatus 110, the second apparatus 120 determines (620) the order for performing the first switch and the second switch. The determination (620) of the order may be similar as the determination (615) performed at the first apparatus 110. In some example embodiments, the second apparatus 120 may determine the order based on at least one of a metric of a link quality or a metric of power headroom. The metric of the link quality may include, for example but not limited to, RSRP, RSRQ, RSSI, SINR, or SNR. The metric of power headroom may include, for example but not limited to, a PHR.

In further example embodiments, the second apparatus 120 may obtain measurements of metrics of a link quality associated with the first network device and the second network device. Then, the second apparatus 120 may determine the order based on a first metric of a link quality of the first transmission and a second metric of a link quality of the second transmission. The determination may be made based on the measurements.

If the first metric of a link quality of the first transmission is better than the second metric of a link quality of the second transmission, the second apparatus 120 may determine that the order as performing the second switch before the first switch. In such case, the last measurement report (Layer 1 (L1) or Layer 3 (L3)) for RSRP, RSRQ, RSSI and/or SINR is considered. For example, a rule may be defined based on the last UE RSRP reporting, such that the TCI state with a worse link quality is activated/switched first, which can be useful if it is expected to lose no link at all. Alternatively, a rule may be defined based on the last UE RSRP reporting, such that the TCI state with a better link quality is activated/switched first, which can be useful if at least one link is expected to stay good even if the other link may be lost.

In alternative example embodiments, the second apparatus 120 may obtain measurements of metrics of a link quality associated with the first network device and the second network device. Then, the second apparatus 120 may determine, based on the measurements, a first prediction result and a second prediction result. The first prediction result is associated with an assumption that the first switch is performed before the second switch, and a second prediction result is associated with an assumption that the second switch is performed before the first switch. The determination regarding to which TCI state needs to be switched/activated first is based on the first prediction result and the second prediction result.

As the measurement reports are reported by the first apparatus 110 to the second apparatus 120, the second apparatus 120 may as well determine the TCI state that will be activated/switched first based on the above-mentioned rules. In some example embodiments, the order may be determined based on a set of the last measurement reports (L1 and L3), still considering metrics like RSRP, RSRQ, RSSI and SINR, and considering for example variations of such metrics at the same time. In such example embodiments, a rule can be defined based on UE RSRP reporting, such that the TCI state whose link quality is degrading either faster or slower is activated/switched first.

Specifically, for a scenario where the first apparatus 110 is configured with DL mTRP and needs to switch from TCI #1 to TCI #3 for the first network device and from TCI #2 to TCI #4 for the second network device, the example embodiments on how the second apparatus 120 can decide which TCI state is to be activated/switched first are similar to those embodiments for the first apparatus 110.

Referring to FIG. 7 again, which illustrates a schematic diagram of different TCI state selection criteria according to some example embodiments of the present disclosure, the RSRP reports for both TCI #1 and TCI #2 are shows. Criterion 1 that selects the TCI to be switched first is based on the last RSRP measurement report. In this example, as the last RSRP measurement for TCI #2 is smaller than the last RSRP measurement for TCI #1, TCI #2 is selected. Criterion 2 that selects the TCI to be switched first based on a linear interpolation of the last 5 RSRP measurement reports. In this example, as the RSRP for TCI #1 is degrading faster than the RSRP for TCI #2, TCI #1 is selected. Other criteria may also be considered for the selection.

In some example embodiments, in addition to the first information and the second information, power headroom may be used as a metric. The second apparatus 120 may obtain a first metric of power headroom of the first network device and a second metric of power headroom of the second network device. Then, the second apparatus 120 may determine the order based on the first metric of power headroom and the second metric of power headroom.

Specifically, a rule can be defined based on the last PHR. If a higher PHR is available at the first apparatus 110 for a transmission toward the first network device rather than the second network device, that is, if a lower UL power is used for the first network device, the first network device may be closer in distance to the first apparatus 110 with respect to the second network device, which potentially indicates a better link toward the first network device. In such case, a rule may be defined such that the TCI state associated to the network device for which a lower PHR is available (i.e., the second network device in the example above) is activated/switched first (targeting to lose no links). Alternatively, a rule may be defined such that the TCI state associated to the network device for which a higher PHR is available (i.e., the first network device in the example above) is activated/switched first (allowing to lose a weaker link). In other example embodiment, a rule may be defined based on a set of the last PHRs, implementing similar criteria to the ones described for the link quality.

In some example embodiments, the first apparatus may include a terminal device, and the second apparatus may include a network device.

Figure 8:
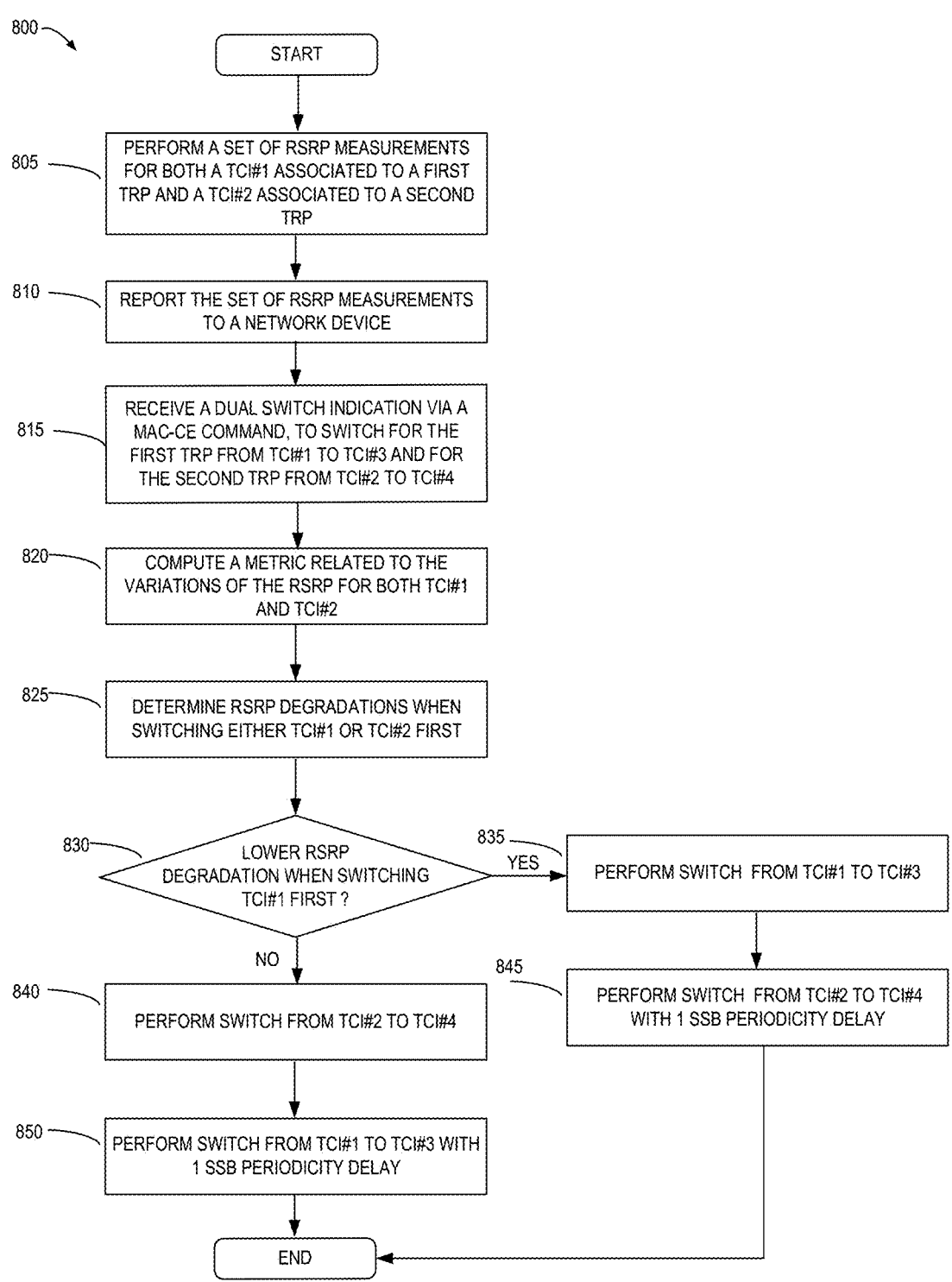
FIG. 8 illustrates a flowchart of a method implemented at a first apparatus according to some example embodiments of the present disclosure.

FIG. 8 illustrates a flowchart 800 of a method implemented at a first apparatus according to some example embodiments of the present disclosure. The flowchart 800 is performed by a terminal device (e.g., a UE), which may be an example of a first apparatus 110 in FIG. 1.

FIG. 8 shows the operations performed by the terminal device for a sDCI mTRP scenario, with the selection of which TCI state to activate/switch first being based on a set of RSRP measurements. The set of RSRP measurements is used to determine which link is degrading faster. As the RSRP measurements are reported by the terminal device to a network device, the network device may as well determine the TCI state that will be activated/switched first based on switching rules. Note that similar flowcharts can be made considering different parameters, for example RSRQ, RSSI or SINR, or for a mDCI mTRP scenario. In this flowchart 800, the following operations are performed.

The terminal device is first configured in DL with sDCI in a mTRP scenario with TCI #1 associated to a first TRP and TCI #2 associated to a second TRP. The TCI #1 and the TCI #2 may be examples of the first source TCI state and the second source TCI state described above respectively. The first TRP and the second TRP may be examples of the network devices 130 in FIG. 1.

At block 805, the terminal device performs a set of RSRP measurements for both TCI #1 associated to a first TRP and TCI #2 associated to a second TRP. The set of RSRP measurements will be used for determining the best pair of TCI states for receiving data from first TRP and second TRP.

At block 810, the terminal device reports the sets of RSRP measurements to a network device in accordance with the configuration by the network device.

At block 815, the terminal device receives a dual switch indication via a MAC-CE command from the network device, to switch for the first TRP from TCI #1 to TCI #3 and for the second TRP from TCI #2 to TCI #4. The network device may use the information received at block 810 to determine the best pair of target TCI states TCI #3 and TCI #4.

At block 820, the terminal device computes a metric related to the variations of the RSRP for both TCI #1 and TCI #2. Prediction results of RSRP values may be computed. The terminal device and the network device are aware of the SSB overlap for TCI #3 and TCI #4, and predict the RSRP values for TCI #1 and TCI #2 in order to determine the TCI switching order.

At block 825, the terminal device determines, for a TCI switching order, a RSRP degradation when switching either TCI #1 or TCI #2 first.

At block 830, the terminal device determines whether there is a lower PSRP degradation when switching TCI #1 first. That is, based on the RSRP degradation determined at block 825, the terminal device determines which TCI state should be switched first by comparing $$\min\left(RSRP^{TCI\#1,first}_{TCI\#1,pred}, RSRP^{TCI\#1,first}_{TCI\#2,pred}\right)$$

with $$\min\left(RSRP^{TCI\#2,first}_{TCI\#1,pred}, RSRP^{TCI\#2,first}_{TCI\#2,pred}\right).$$

At block 835, if $$\min\left(RSRP^{TCI\#1,first}_{TCI\#1,pred}, RSRP^{TCI\#1,first}_{TCI\#2,pred}\right) \geq \min\left(RSRP^{TCI\#2,first}_{TCI\#1,pred}, RSRP^{TCI\#2,first}_{TCI\#2,pred}\right),$$

the terminal device performs switch from TCI #1 to TCI #3 before the switch from TCI #2 to TCI #4, otherwise the terminal device jumps to block 840.

At block 845, following block 835, the terminal device performs the switch from TCI #2 to TCI #4 with 1 SSB periodicity delay after the switch from TCI #1 to TCI #3. After this, both the TCI switches are concluded.

At block 840, if $$\min\left(RSRP^{TCI\#1,first}_{TCI\#1,pred}, RSRP^{TCI\#1,first}_{TCI\#2,pred}\right) < \min\left(RSRP^{TCI\#2,first}_{TCI\#1,pred}, RSRP^{TCI\#2,first}_{TCI\#2,pred}\right),$$

the terminal device performs the switch from TCI #2 to TCI #4.

At block 850, following block 840, the terminal device performs the switch from TCI #1 to TCI #3 1 with 1 SSB periodicity delay after the switch from TCI #2 to TCI #4. After this, both the TCI switches are concluded.

FIG. 9 shows a flowchart of an example method 900 implemented at a first apparatus in accordance with some example embodiments of the present disclosure. For the purpose of discussion, the method 900 will be described from the perspective of the first apparatus 110 in FIG. 1.

At block 910, the first apparatus 110 receives a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

At block 920, the first apparatus 110 determines an order for performing the first switch and the second switch, the order being associated with at least one of first information about a first transmission between the first network device and the first apparatus or second information about a second transmission between the second network device and the first apparatus.

In some example embodiments, the first apparatus 110 may further receive the first indication and the second indication in a single Medium Access Control (MAC) Control Element (CE) command from one of the first network device and the second network device; or receive the first indication in a MAC CE command from the first network device and the second indication in a further MAC CE command form the second network device.

In some example embodiments, the first information comprises at least one of: a metric of a link quality of the first transmission, or a metric of power headroom of the first network device, and wherein the second information comprises at least one of: a metric of a link quality of the second transmission, or a metric of power headroom of the second network device.

In some example embodiments, the metric of the link quality comprises at least one of: Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom of the first network device comprises a Power Headroom Report (PHR).

In some example embodiments, the first apparatus 110 may further obtain measurements of metrics of a link quality associated with the first network device and the second network device; and determine, based on the measurements, the order based on a first metric of a link quality of the first transmission and a second metric of a link quality of the second transmission.

In some example embodiments, the first apparatus 110 may further, in accordance with a determination that the first metric of a link quality of the first transmission is better than the second metric of a link quality of the second transmission, determine that the order as performing the second switch before the first switch.

In some example embodiments, the first apparatus 110 may further obtain measurements of metrics of a link quality associated with the first network device and the second network device; determine, based on the measurements, a first prediction result associated with an assumption that the first switch is performed before the second switch, and a second prediction result associated with an assumption that the second switch is performed before the first switch; and determine the order based on the first prediction result and the second prediction result.

In some example embodiments, the first apparatus 110 may further, in accordance with a determination that all metrics of the link quality in the first prediction result are larger than those in the second prediction result, determine that the order as performing the first switch before the second switch; or in accordance with a determination that all metrics of the link quality in the first prediction result are less than those in the second prediction result, determine that the order as performing the first switch before the second switch.

In some example embodiments, the first apparatus 110 may further, in accordance with a determination that a degrading speed of metrics of the link quality in the first prediction result is less than that in the second prediction result, determine that the order as performing the first switch before the second switch; or in accordance with a determination that the degrading speed of metrics of the link quality in the first prediction result is greater than that in the second prediction result, determine that the order as performing the first switch before the second switch.

In some example embodiments, the measurements are obtained from one or more measurement reports about at least one of the first transmission and the second transmission.

In some example embodiments, the first apparatus 110 may further obtain a first metric of power headroom of the first network device and a second metric of power headroom of the second network device; and determine the order based on the first metric of power headroom and the second metric of power headroom.

In some example embodiments, the first apparatus 110 may further, in accordance with a determination that the first metric of power headroom is larger than the second metric of power headroom, determine that the order as performing the first switch before the second switch; or in accordance with a determination that the first metric of power headroom is larger than the second metric of power headroom, determine that the order as performing the second switch before the first switch.

In some example embodiments, the first metric of power headroom is determined based on at least one Power Headroom Report (PHR) associated with the first network device, and the second metric of power headroom is determined based on at least one PHR associated with the second network device.

In some example embodiments, the first apparatus 110 may further determine, based on the first information and the second information, information about which of the first network device and the second network device carries the downlink control channel; and determine the order based on the determined information.

In some example embodiments, the first apparatus 110 may further, in accordance with a determination that the first network device is associated with the downlink control channel, determine that the order as performing the first switch before the second switch.

In some example embodiments, a link quality of the downlink control channel is lower than a first threshold, or wherein a link quality of a channel other than the downlink control channel is above a second threshold.

In some example embodiments, the first apparatus comprises a terminal device.

FIG. 10 shows a flowchart of an example method 1000 implemented at a second apparatus in accordance with some example embodiments of the present disclosure. For the purpose of discussion, the method 1000 will be described from the perspective of the second apparatus 120 in FIG. 1.

At block 1010, the second apparatus 120 causes a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

At block 1020, the second apparatus 120 determines an order for performing the first switch and the second switch.

In some example embodiments, the second apparatus 120 may further determine the order based on at least one of a metric of a link quality or a metric of power headroom.

In some example embodiments, the metric of the link quality comprises at least one of: Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom comprises a Power Headroom Report (PHR).

In some example embodiments, the second apparatus 120 may further obtain measurements of metrics of a link quality associated with the first network device and the second network device; and determine, based on the measurements, the order based on a first metric of a link quality associated with the first network device and a second metric of a link quality associated with the second network device.

In some example embodiments, the second apparatus 120 may further obtain measurements of metrics of a link quality associated with the first network device and the second network device; determine, based on the measurements, a first prediction result associated with an assumption that the first switch is performed before the second switch, and a second prediction result associated with an assumption that the second switch is performed before the first switch; and determine the order based on the first prediction result and the second prediction result.

In some example embodiments, the second apparatus 120 may further obtain a first metric of power headroom of the first network device and a second metric of power headroom of the second network device; and determine the order based on the first metric of power headroom and the second metric of power headroom.

In some example embodiments, the first apparatus comprises a terminal device, and the second apparatus comprises a network device.

In some example embodiments, a first apparatus capable of performing any of the method 900 (for example, the first apparatus 110 in FIG. 1) may comprise means for performing the respective operations of the method 900. The means may be implemented in any suitable form. For example, the means may be implemented in a circuitry or software module. The first apparatus may be implemented as or included in the first apparatus 110 in FIG. 1.

In some example embodiments, the first apparatus comprises means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch, the order being associated with at least one of first information about a first transmission between the first network device and the first apparatus or second information about a second transmission between the second network device and the first apparatus.

In some example embodiments, the first apparatus further comprises: means for receiving the first indication and the second indication in a single Medium Access Control (MAC) Control Element (CE) command from one of the first network device and the second network device; or means for receiving the first indication in a MAC CE command from the first network device and the second indication in a further MAC CE command form the second network device.

In some example embodiments, the first information comprises at least one of: a metric of a link quality of the first transmission, or a metric of power headroom of the first network device, and wherein the second information comprises at least one of: a metric of a link quality of the second transmission, or a metric of power headroom of the second network device.

In some example embodiments, the metric of the link quality comprises at least one of: Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom of the first network device comprises a Power Headroom Report (PHR).

In some example embodiments, the first apparatus further comprises: means for obtaining measurements of metrics of a link quality associated with the first network device and the second network device; and means for determining, based on the measurements, the order based on a first metric of a link quality of the first transmission and a second metric of a link quality of the second transmission.

In some example embodiments, the first apparatus further comprises: means for in accordance with a determination that the first metric of a link quality of the first transmission is better than the second metric of a link quality of the second transmission, determining that the order as performing the second switch before the first switch.

In some example embodiments, the first apparatus further comprises: means for obtaining measurements of metrics of a link quality associated with the first network device and the second network device; means for determining, based on the measurements, a first prediction result associated with an assumption that the first switch is performed before the second switch, and a second prediction result associated with an assumption that the second switch is performed before the first switch; and means for determining the order based on the first prediction result and the second prediction result.

In some example embodiments, the first apparatus further comprises: means for in accordance with a determination that all metrics of the link quality in the first prediction result are larger than those in the second prediction result, determining that the order as performing the first switch before the second switch; or means for in accordance with a determination that all metrics of the link quality in the first prediction result are less than those in the second prediction result, determining that the order as performing the first switch before the second switch.

In some example embodiments, the first apparatus further comprises: means for in accordance with a determination that a degrading speed of metrics of the link quality in the first prediction result is less than that in the second prediction result, determining that the order as performing the first switch before the second switch; or means for in accordance with a determination that the degrading speed of metrics of the link quality in the first prediction result is greater than that in the second prediction result, determining that the order as performing the first switch before the second switch.

In some example embodiments, the measurements are obtained from one or more measurement reports about at least one of the first transmission and the second transmission.

In some example embodiments, the first apparatus further comprises: means for obtaining a first metric of power headroom of the first network device and a second metric of power headroom of the second network device; and means for determining the order based on the first metric of power headroom and the second metric of power headroom.

In some example embodiments, the first apparatus further comprises: means for in accordance with a determination that the first metric of power headroom is larger than the second metric of power headroom, determining that the order as performing the first switch before the second switch; or means for in accordance with a determination that the first metric of power headroom is larger than the second metric of power headroom, determining that the order as performing the second switch before the first switch.

In some example embodiments, the first metric of power headroom is determined based on at least one Power Headroom Report (PHR) associated with the first network device, and the second metric of power headroom is determined based on at least one PHR associated with the second network device.

In some example embodiments, the first apparatus further comprises: means for determining, based on the first information and the second information, information about which of the first network device and the second network device carries the downlink control channel; and means for determining the order based on the determined information.

In some example embodiments, the first apparatus further comprises: means for in accordance with a determination that the first network device is associated with the downlink control channel, determining that the order as performing the first switch before the second switch.

In some example embodiments, a link quality of the downlink control channel is lower than a first threshold, or wherein a link quality of a channel other than the downlink control channel is above a second threshold.

In some example embodiments, the first apparatus comprises a terminal device.

In some example embodiments, the first apparatus further comprises means for performing other operations in some example embodiments of the method 900 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 1000 (for example, the second apparatus 120 in FIG. 1) may comprise means for performing the respective operations of the method 1000. The means may be implemented in any suitable form. For example, the means may be implemented in a circuitry or software module. The second apparatus may be implemented as or included in the second apparatus 120 in FIG. 1.

In some example embodiments, the second apparatus comprises means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

In some example embodiments, the second apparatus further comprises: means for determining the order based on at least one of a metric of a link quality or a metric of power headroom.

In some example embodiments, the metric of the link quality comprises at least one of: Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom comprises a Power Headroom Report (PHR).

In some example embodiments, the second apparatus further comprises: means for obtaining measurements of metrics of a link quality associated with the first network device and the second network device; and means for determining, based on the measurements, the order based on a first metric of a link quality associated with the first network device and a second metric of a link quality associated with the second network device.

In some example embodiments, the second apparatus further comprises: means for obtaining measurements of metrics of a link quality associated with the first network device and the second network device; means for determining, based on the measurements, a first prediction result associated with an assumption that the first switch is performed before the second switch, and a second prediction result associated with an assumption that the second switch is performed before the first switch; and means for determining the order based on the first prediction result and the second prediction result.

In some example embodiments, the second apparatus further comprises: means for obtaining a first metric of power headroom of the first network device and a second metric of power headroom of the second network device; and means for determining the order based on the first metric of power headroom and the second metric of power headroom.

In some example embodiments, the first apparatus comprises a terminal device, and the second apparatus comprises a network device.

In some example embodiments, the second apparatus further comprises means for performing other operations in some example embodiments of the method 1000 or the second apparatus 120. In some example embodiments, the means comprises at least one processor; and at least one memory storing instructions that, when executed by the at least one processor, cause the performance of the second apparatus.

Figure 11:
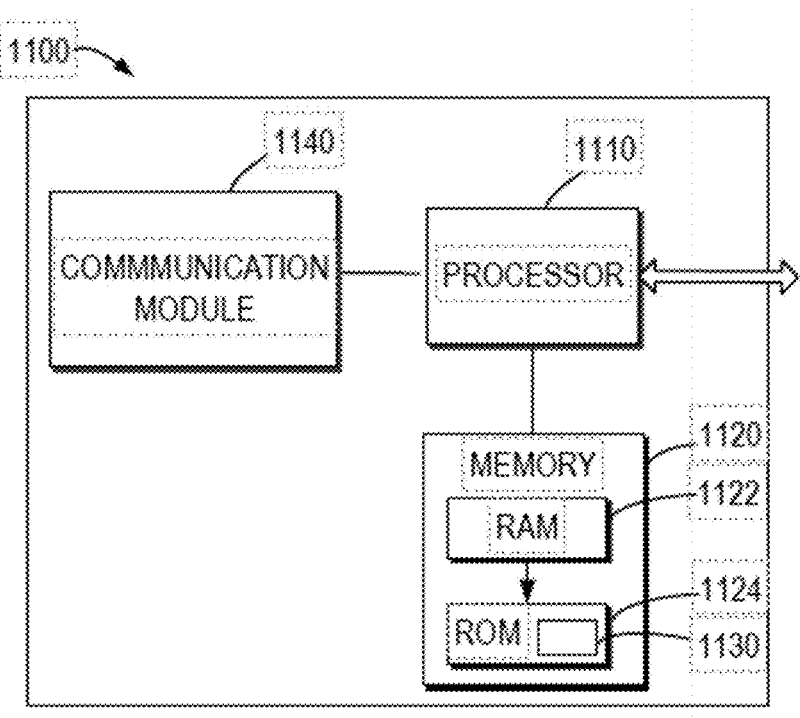
FIG. 11 illustrates a simplified block diagram of a device that is suitable for implementing example embodiments of the present disclosure.

FIG. 11 is a simplified block diagram of a device 1100 that is suitable for implementing example embodiments of the present disclosure. The device 1100 may be provided to implement a communication device, for example, the first apparatus 110 or the second apparatus 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has one or more communication interfaces to facilitate communication with one or more other modules or devices. The communication interfaces may represent any interface that is necessary for communication with other network elements. In some example embodiments, the communication module 1140 may include at least one antenna.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The instructions of the program 1130 may include instructions for performing operations/acts of some example embodiments of the present disclosure. The program 1130 may be stored in the memory, e.g., the ROM 1124. The processor 1110 may perform any suitable actions and processing by loading the program 1130 into the RAM 1122.

The example embodiments of the present disclosure may be implemented by means of the program 1130 so that the device 1100 may perform any process of the disclosure as discussed with reference to FIG. 1 to FIG. 13. The example embodiments of the present disclosure may also be implemented by hardware or by a combination of software and hardware.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 12:
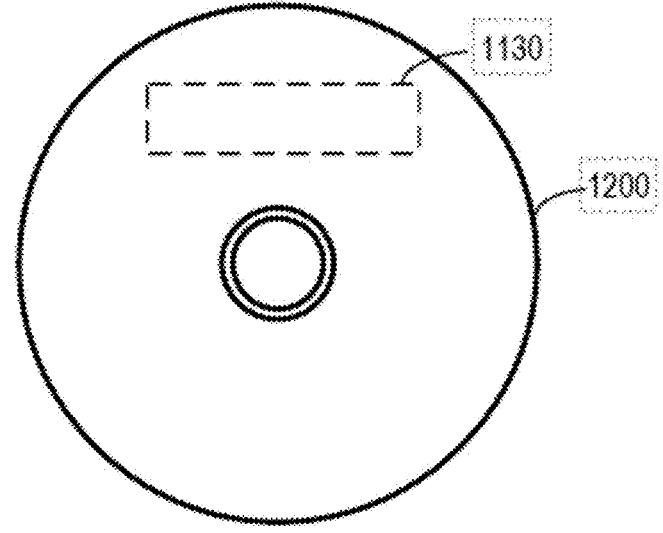
FIG. 12 illustrates a block diagram of an example computer readable medium in accordance with some example embodiments of the present disclosure.

FIG. 12 shows an example of the computer readable medium 1200 which may be in form of CD, DVD or other optical storage disk. The computer readable medium 1200 has the program 1130 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims or any of the below embodiments.

Embodiment 1: A second apparatus comprising: at least one processor; and at least one memory storing instructions that, when executed by the at least one processor, cause the second apparatus at least to: cause a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determine an order for performing the first switch and the second switch.

Embodiment 2: The second apparatus of Embodiment 1, wherein the second apparatus is caused to: determine the order based on at least one of a metric of a link quality or a metric of power headroom.

Embodiment 3: The second apparatus of Embodiment 2, wherein the metric of the link quality comprises at least one of: Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom comprises a Power Headroom Report (PHR).

Embodiment 4: The second apparatus of Embodiment 2 or 3, wherein the second apparatus is caused to: obtain measurements of metrics of a link quality associated with the first network device and the second network device; and determine, based on the measurements, the order based on a first metric of a link quality associated with the first network device and a second metric of a link quality associated with the second network device.

Embodiment 5: The second apparatus of Embodiment 2 or 3, wherein the second apparatus is caused to: obtain measurements of metrics of a link quality associated with the first network device and the second network device; determine, based on the measurements, a first prediction result associated with an assumption that the first switch is performed before the second switch, and a second prediction result associated with an assumption that the second switch is performed before the first switch; and determine the order based on the first prediction result and the second prediction result.

Embodiment 6: The second apparatus of Embodiment 2 or 3, wherein the second apparatus is caused to: obtain a first metric of power headroom of the first network device and a second metric of power headroom of the second network device; and determine the order based on the first metric of power headroom and the second metric of power headroom.

Embodiment 7: The second apparatus of any of Embodiments 1 to 6, wherein the first apparatus comprises a terminal device, and the second apparatus comprises a network device.

Embodiment 8: A method comprising: receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch, the order being associated with at least one of first information about a first transmission between the first network device and the first apparatus or second information about a second transmission between the second network device and the first apparatus.

Embodiment 9: A method comprising: causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch.

Embodiment 10: A first apparatus comprising: means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch, the order being associated with at least one of first information about a first transmission between the first network device and the first apparatus or second information about a second transmission between the second network device and the first apparatus.

Embodiment 11: A second apparatus comprising: means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

Embodiment 12: A computer readable medium comprising instructions stored thereon for causing an apparatus at least to perform the method of Embodiment 8 or the method of Embodiment 9.

What is claimed is:
1. A first apparatus comprising:
at least one processor; and
at least one memory storing instructions that, when executed by the at least one processor, cause the first apparatus at least to:
    receive a first indication indicating a first switch to a first target transmission configuration indicator (TCI) state is to be performed, and a second indication indicating a second switch to a second target TCI state is to be performed, a first source TCI state having been activated for a first network device, and a second source TCI state having been activated for a second network device, wherein synchronization signal blocks associated with the first target TCI state and the second target TCI state are adjacent or overlap;
    determine an order for performing the first switch and the second switch, the order being associated with at least one of first information about a first transmission between the first network device and the first apparatus and/or second information about a second transmission between the second network device and the first apparatus; and
    receive a synchronization signal block associated with the first target TCI state and synchronization signal block associated with the second target TCI state, wherein synchronization signal blocks are received in an order according to the determined order for performing the first switch and the second switch.

2. The first apparatus of claim 1, wherein the first apparatus is caused to:
    receive the first indication and the second indication in a single Medium Access Control (MAC) Control Element (CE) command from one of the first network device and the second network device; or
    receive the first indication in a MAC CE command from the first network device and the second indication in a further MAC CE command form the second network device.

3. The first apparatus of 1, wherein the first information comprises at least one of:
    a metric of a link quality of the first transmission, or
    a metric of power headroom of the first network device,
    and/or
    wherein the second information comprises at least one of:
        a metric of a link quality of the second transmission, or
        a metric of power headroom of the second network device.

4. The first apparatus of claim 3, wherein the metric of the link quality comprises at least one of:
    Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and
    the metric of power headroom of the first network device comprises a Power Headroom Report (PHR).

5. The first apparatus of claim 3, wherein the first apparatus is caused to:
    obtain measurements of metrics of a link quality associated with the first network device and the second network device; and
    determine, based on the measurements, the order based on a first metric of a link quality of the first transmission and a second metric of a link quality of the second transmission.

6. The first apparatus of claim 5, wherein the first apparatus is caused to:

in accordance with a determination that the first metric of a link quality of the first transmission is better than the second metric of a link quality of the second transmission, determine that the order as performing the second switch before the first switch.

7. The first apparatus of claim 3, wherein the first apparatus is caused to:

obtain measurements of metrics of a link quality associated with the first network device and the second network device;

determine, based on the measurements, a first prediction result associated with an assumption that the first switch is performed before the second switch, and a second prediction result associated with an assumption that the second switch is performed before the first switch; and determine the order based on the first prediction result and the second prediction result.

8. The first apparatus of claim 7, wherein the first apparatus is caused to:

in accordance with a determination that all metrics of the link quality in the first prediction result are larger than those in the second prediction result, determine that the order as performing the first switch before the second switch; or in accordance with a determination that all metrics of the link quality in the first prediction result are less than those in the second prediction result, determine that the order as performing the first switch before the second switch; or in accordance with a determination that a degrading speed of metrics of the link quality in the first prediction result is less than that in the second prediction result, determine that the order as performing the first switch before the second switch; or in accordance with a determination that the degrading speed of metrics of the link quality in the first prediction result is greater than that in the second prediction result, determine that the order as performing the first switch before the second switch.

9. The first apparatus of claim 5, wherein the measurements are obtained from one or more measurement reports about at least one of the first transmission and the second transmission.

10. The first apparatus of claim 3, wherein the first apparatus is caused to:

obtain a first metric of power headroom of the first network device and a second metric of power headroom of the second network device; and determine the order based on the first metric of power headroom and the second metric of power headroom.

11. The first apparatus of claim 10, wherein the first apparatus is caused to:

in accordance with a determination that the first metric of power headroom is larger than the second metric of power headroom, determine that the order as performing the first switch before the second switch; or in accordance with a determination that the first metric of power headroom is larger than the second metric of power headroom, determine that the order as performing the second switch before the first switch.

12. The first apparatus of claim 11, wherein the first metric of power headroom is determined based on at least one Power Headroom Report (PHR) associated with the first network device, and the second metric of power headroom is determined based on at least one PHR associated with the second network device.

13. The first apparatus of claim 1, wherein the first apparatus is caused to:

determine, based on the first information and the second information, information about which of the first network device and the second network device carries the downlink control channel; and determine the order based on the determined information.

14. The first apparatus of claim 13, wherein the first apparatus is caused to:

in accordance with a determination that the first network device is associated with the downlink control channel, determine that the order as performing the first switch before the second switch.

15. A method comprising:

receiving, at a first apparatus, a first indication indicating a first switch to a first target transmission configuration indicator (TCI) state is to be performed, and a second indication indicating a second switch to a second target TCI state is to be performed, a first source TCI state having been activated for a first network device, and a second source TCI state having been activated for a second network device, wherein-reference signals synchronization signal blocks associated with the first target TCI state and the second target TCI state are adjacent or overlap;

determining, at the first apparatus, an order for performing the first switch and the second switch, the order being associated with at least one of first information about a first transmission between the first network device and the first apparatus and/or second information about a second transmission between the second network device and the first apparatus; and receiving, at the first apparatus, a synchronization signal block associated with the first target TCI state and synchronization signal block associated with the second target TCI state, wherein the synchronization signal blocks are received in an order according to the determined order for performing the first switch and the second switch.

16. The method claim 15, further comprising:

receiving, at the first apparatus, the first indication and the second indication in a single Medium Access Control (MAC) Control Element (CE) command from one of the first network device and the second network device; or receiving, at the first apparatus, the first indication in a MAC CE command from the first network device and the second indication in a further MAC CE command form the second network device.

17. The method of 15, wherein the first information comprises at least one of:

a metric of a link quality of the first transmission, or a metric of power headroom of the first network device, and wherein the second information comprises at least one of:

a metric of a link quality of the second transmission, or a metric of power headroom of the second network device.

18. The method claim 17, wherein the metric of the link quality comprises at least one of:

Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR), and the metric of power headroom of the first network device comprises a Power Headroom Report (PHR).

19. The method of claim 17, further comprising:

obtaining, at the first apparatus, measurements of metrics of a link quality associated with the first network device and the second network device; and determining, at the first apparatus, based on the measurements, the order based on a first metric of a link quality of the first transmission and a second metric of a link quality of the second transmission.

20. A second apparatus comprising:

at least one processor; and at least one memory storing instructions that, when executed by the at least one processor, cause the second apparatus at least to:

cause a first indication and a second indication to be transmitted to a first apparatus, the first indication indicating a first switch to a first target transmission configuration indicator (TCI) state is to be performed, and the second indication indicating a second switch to a second target TCI state is to be performed, a first source TCI state having been activated for a first network device, and a second source TCI state having been activated for a second network device, wherein synchronization signal blocks associated with the first target TCI state and the second target TCI state are adjacent or overlap;

determine an order for performing the first switch and the second switch, the order being associated with at least one of first information about a first transmission between the first network device and/or a second apparatus or second information about a second transmission between the second network device and the second apparatus; and transmit a synchronization signal block associated with the first target TCI state and synchronization signal block associated with the second target TCI state, wherein the synchronization signal blocks are transmitted by the second apparatus in an order according to the determined order for performing the first switch and the second switch.

* * * * *